US009505620B2

(12) United States Patent
Denton et al.

(10) Patent No.: US 9,505,620 B2
(45) Date of Patent: Nov. 29, 2016

(54) CARBONACEOUS FEEDSTOCKS FOR FORMING CARBON ALLOTROPES

(71) Applicants: ExxonMobil Upstream Research Company, Houston, TX (US); Solid Carbon Products LLC, Provo, UT (US)

(72) Inventors: Robert D. Denton, Houston, TX (US); Dallas B. Noyes, Provo, UT (US); Russell J. Koveal, Jr., Baton Rouge, LA (US); Terry A. Ring, Sandy, UT (US)

(73) Assignees: EXXONMOBIL UPSTREAM RESEARCH COMPANY, Houston, TX (US); SOLID CARBON PRODUCTS, LLC, Provo, UT (US)

( * ) Notice: Subject to any disclaimer, the term of this patent is extended or adjusted under 35 U.S.C. 154(b) by 0 days.

(21) Appl. No.: 14/395,442

(22) PCT Filed: Apr. 10, 2013

(86) PCT No.: PCT/US2013/035979
§ 371 (c)(1),
(2) Date: Oct. 17, 2014

(87) PCT Pub. No.: WO2013/158438
PCT Pub. Date: Oct. 24, 2013

(65) Prior Publication Data
US 2015/0147261 A1    May 28, 2015

Related U.S. Application Data

(60) Provisional application No. 61/625,669, filed on Apr. 17, 2012, provisional application No. 61/625,665, filed on Apr. 7, 2012.

(51) Int. Cl.
*C01B 31/02* (2006.01)
*D01F 9/12* (2006.01)
(Continued)

(52) U.S. Cl.
CPC .......... *C01B 31/0226* (2013.01); *B01J 8/1836* (2013.01); *C01B 31/0213* (2013.01); *D01F 9/12* (2013.01); *D01F 9/127* (2013.01); *B01J 2208/00876* (2013.01); *Y02P 20/129* (2015.11)

(58) Field of Classification Search
CPC ........... C01B 31/022; C01B 31/0226; C01B 31/0233; C01B 31/024; C01B 31/0246; C01B 31/0253; C01B 31/026; C01B 31/0266; C01B 31/0273; C01B 31/028; C01B 31/0286; C01B 31/0293; C01B 2202/00; C01B 2202/02; C01B 2202/04
USPC ....................... 423/447.3; 422/187
See application file for complete search history.

(56) References Cited

U.S. PATENT DOCUMENTS

| | | | |
|---|---|---|---|
| 2,796,331 A | 6/1957 | Kauffman et al. | |
| 4,395,033 A * | 7/1983 | Janssen | B65H 3/0646 271/10.09 |
| 4,423,035 A * | 12/1983 | Strayer | A61K 39/099 424/253.1 |

(Continued)

FOREIGN PATENT DOCUMENTS

WO    WO2007047063 A2    4/2007
WO    WO/2010/120581 A1   10/2010

OTHER PUBLICATIONS

ExxonMobile Technical Bulletin—Hydrogen Sulfide (H2S), accessed online at https://lubes.exxonmobil.com/MarineLubes-En/Files/hydrogen-sulfide.pdf on May 14, 2016.*

(Continued)

*Primary Examiner* — Daniel C McCracken
(74) *Attorney, Agent, or Firm* — International IP Law Group, P.L.L.C.

(57) ABSTRACT

Methods and systems are provided for forming carbon allotropes. An exemplary method includes treating a carbonaceous compound to form a feedstock that includes at least about 10 mol % oxygen, at least about 10 mol % carbon, and at least about 20 mol % hydrogen. Carbon allotropes are formed from the feedstock in a reactor in a Bosch reaction at a temperature of at least about 500° C. The carbon allotropes are separated from a reactor effluent stream.

29 Claims, 11 Drawing Sheets

(51) Int. Cl.
*D01F 9/127* (2006.01)
*B01J 8/18* (2006.01)

(56) References Cited

U.S. PATENT DOCUMENTS

| | | | |
|---|---|---|---|
| 4,820,591 A * | 4/1989 | Ramanarayanan | C23C 8/02 138/143 |
| 6,123,832 A * | 9/2000 | Ho | C10G 11/18 208/113 |
| 8,679,444 B2 | 3/2014 | Noyes | |
| 2003/0111410 A1 | 6/2003 | Branson | |
| 2008/0274277 A1 | 11/2008 | Rashidi et al. | |
| 2012/0034150 A1 | 2/2012 | Noyes | |

OTHER PUBLICATIONS

Karthikeyan, et al., Large Scale Synthesis of Carbon Nanotubes. E-Journal of Chemistry, 2009, 6(1), 1-12.
PCT International Search Report, dated Jul. 29, 2013, for PCT Application PCT/US13/35979, Filed Apr. 10, 2013.
Vander Wal, R.L., et al., Flame Synthesis of Single-Walled Carbon Nanotubes and Nanofibers. Seventh International Workshop on Microgravity Combustion and Chemically Reacting Systems, Aug. 2003, 73-76 (NASA Research Publication: NASA/CP-2003-212376/REV1).
Written Opinion of the International Search Authority, dated Jul. 29, 2013, for PCT Application PCT/US13/35979, Filed Apr. 10, 2013.

* cited by examiner

200

400

CARBONACEOUS FEEDSTOCKS FOR FORMING CARBON ALLOTROPES

CROSS REFERENCE TO RELATED APPLICATIONS

Pursuant to 35 U.S.C. §371, this application is a U.S. National Stage Application of International Patent Application No. PCT/US2013/035979, filed on 10 Apr. 2013, which claims priority based on U.S. Provisional Application Ser. No. 61/625,669, filed 17 Apr. 2012, titled "Feedstocks For Forming Carbon Allotropes" and U.S. Provisional Application Ser. No. 61/625,665, filed 17 Apr. 2012, titled "Carbonaceous Feedstocks For Forming Carbon Allotropes" the contents of which are incorporated by reference as if set forth in their entirety herein. The previous provisional applications are related to U.S. patent application Ser. No. 13/263,311 by Noyes and titled "Method for Producing Solid Carbon by Reducing Carbon Oxides," which was filed 06 Oct. 2011, which claims priority based on International Patent Application Number PCT/US2010/029934, by Noyes, entitled "Method for Producing Solid Carbon by Reducing Carbon Oxides," which was filed on 05 Apr. 2010, which in turn claims priority based on U.S. Provisional Patent Application Ser. No. 61/170,199 filed 17 Apr. 2009 and titled "Method for Producing Solid Carbon by Reducing Carbon Oxides," the disclosures of all of which are incorporated herein by this reference.

FIELD

The present techniques relate to an industrial scale process for forming carbon allotropes, such as carbon fibers and carbon nanomaterials. More specifically, the techniques disclose methods and systems for forming treating carbonaceous compounds to form feedstocks for forming form carbon allotropes.

BACKGROUND

This section is intended to introduce various aspects of the art, which may be associated with exemplary embodiments of the present techniques. This discussion is believed to assist in providing a framework to facilitate a better understanding of particular aspects of the present techniques. Accordingly, it should be understood that this section should be read in this light, and not necessarily as admissions of prior art.

Materials formed predominately of solid or elemental carbon, e.g., carbon allotropes, have been used in numerous products for many years. For example, carbon black is a high carbon content material used as a pigment and reinforcing compound in rubber and plastic products, such as car tires. Carbon black is usually formed by the incomplete thermal pyrolysis of hydrocarbons, such as methane or heavy aromatic oils. Thermal blacks, formed by the pyrolysis of natural gas, include large unagglomerated particles, for example, in the range of 200-500 nm in size, among others. Furnace blacks, formed by the pyrolysis of heavy oils, include much smaller particles, in the range of 10-100 nm in size, that agglomerate or stick together to form structures. In both cases, the particles may be formed from layers of graphene sheets that have open ends or edges. Chemically, the open edges form reactive areas that can be used for absorption, bonding into matrices, and the like.

More recent allotropes of elemental carbon, such as fullerenes, have been developed, and are starting to be developed in commercial applications. In contrast to the more open structures of carbon black, fullerenes are formed from carbon in a closed graphene structure, i.e., in which the edges are bonded to other edges to form spheres, tubes, and the like. Two structures, carbon nanofibers and carbon nanotubes, have numerous potential applications, ranging from batteries and electronics to use in concrete in the construction industry. Carbon nanomaterials may have a single wall of graphene or multiple nested walls of graphene or form a fiber structure from a stacked set of sheets in a cup or plate form. The ends of the carbon nanotubes are often capped with hemispherical structures, in a fullerene-like configuration. Unlike for carbon black, large scale production processes have not been implemented for carbon nanomaterials. However, research has been conducted on a number of proposed production processes.

Arc-based, laser-based ablation techniques and chemical vapor deposition have classically been used to generate carbon nanotubes from a carbon surface. For example, techniques for generating carbon nanotubes are reviewed in Karthikeyan, et al., "Large Scale Synthesis of Carbon Nanotubes," E-Journal of Chemistry, 2009, 6(1), 1-12. In one technique described, an electric arc is used to vaporize graphite from electrodes in the presence of metal catalysts, achieving production rates of about 1 gram/min. Another technique described uses laser ablation to vaporize carbon from a target electrode in an inert gas stream. However, the laser technique uses high purity graphite and high power lasers, but provides a low yield of carbon nanotubes, making it impractical for large scale synthesis. A third technique described by the authors, is based on chemical vapor deposition (CVD), in which a hydrocarbon is thermally decomposed in the presence of a catalyst. In some studies, these techniques have achieved production rates of up to a few kilograms/hour at a 70% purity level. However, none of the processes described are practical for large scale commercial production.

Hydrocarbon pyrolysis is used in the production of carbon black and various carbon nanotube and fullerene products. Various methods exist for creating and harvesting various forms of solid carbon through the pyrolysis of hydrocarbons using temperature, pressure, and the presence of a catalyst to govern the resulting solid carbon morphology. For example, Kauffman et al. (U.S. Pat. No. 2,796,331) discloses a process for making fibrous carbon of various forms from hydrocarbons in the presence of surplus hydrogen using hydrogen sulfide as a catalyst, and methods for collecting the fibrous carbon on solid surfaces. Kauffman also claims the use of coke oven gas as the hydrocarbon source.

In another study, a flame based technique is described in Vander Wal, R. L., et al., "Flame Synthesis of Single-Walled Carbon Nanotubes and Nanofibers," Seventh International Workshop on Microgravity Combustion and Chemically Reacting Systems, August 2003, 73-76 (NASA Research Publication: NASA/CP-2003-212376/REV1). The technique used the introduction of a CO or $CO/C_2H_2$ mixture into a flame along with a catalyst to form the carbon nanotubes. The authors noted the high productivity that could be achieved using flame based techniques for the production of carbon black. However, the authors noted that scaling the flame synthesis presented numerous challenges. Specifically, the total time for catalyst particle formation, inception of the carbon nanotubes, and growth of the carbon nanotubes was limited to about 100 milliseconds.

International Patent Application Publication WO/2010/120581, by Noyes, discloses a method for the production of various morphologies of solid carbon product by reducing carbon oxides with a reducing agent in the presence of a catalyst. The carbon oxides are typically either carbon monoxide or carbon dioxide. The reducing agent is typically either a hydrocarbon gas or hydrogen. The desired morphology of the solid carbon product may be controlled by the specific catalysts, reaction conditions and optional additives used in the reduction reaction.

The techniques described allow for the formation of carbon nanotubes from pure gas streams. However, the economics of the production process may not be optimum, since the feedstocks are obtained from sources that are already at relatively high purity levels.

SUMMARY

An embodiment disclosed herein provides a method for forming carbon allotropes. The method includes treating a carbonaceous compound to form a feedstock that includes at least about 10 mol % oxygen, at least about 10 mol % carbon, and at least about 20 mol % hydrogen. Carbon allotropes are formed from the feedstock in a reactor in a Bosch reaction at a temperature of at least about 500° C. The carbon allotropes are separated from a reactor effluent stream.

Another embodiment provides a system for the production of carbon allotropes. The system includes a carbonaceous compound, wherein the carbonaceous compound is treated to form a feedstock that includes at least about 10 mol % oxygen, at least about 10 mol % carbon, and at least about 20 mol hydrogen. A feed gas heater is configured to heat the feedstock with waste heat from a waste gas stream. A reactor is configured to form carbon allotropes from the feedstock in a Bosch reaction. A separator is configured to separate the carbon allotropes from a reactor effluent stream forming the waste gas stream, and a water removal system, which includes an ambient temperature heat exchanger and separator, is configured to separate the bulk of the water from the waste gas stream to form a dry waste gas stream.

Another embodiment provides a reaction system for forming carbon nanotubes. The system includes a treatment system that is configured to form a feedstock from a carbonaceous compound, wherein the feedstock includes at least about 10 mol % oxygen, at least about 10 mol % carbon, and at least about 20 mol % hydrogen. A purification system is configured to remove compounds including elements other than carbon, hydrogen, and oxygen from the feedstock. A feed heater upstream of the reactor is configured to convert the feedstock to a gaseous stream and to heat the feedstock prior to injection into a reactor. A reactor is configured to form carbon nanotubes from the gaseous stream using a Bosch reaction. A separation system downstream of the reactor is configured to remove carbon nanotubes from an effluent from the reactor. A feed heater downstream of the separation system includes a heat exchanger that is configured to heat a feed gas stream for a following reactor using waste heat from the effluent from the reactor. An ambient temperature heat exchanger downstream of the feed heater is configured to remove water from the effluent, forming a waste stream. A compressor is configured to increase the pressure of the waste stream. An ambient temperature heat exchanger downstream of the compressor is configured to remove water from the waste stream. A gas fractionation system is configured to separate the waste stream into a methane enriched stream and a carbon dioxide enriched stream, and a mixer is configured to blend the methane enriched stream or the carbon dioxide enriched stream into an initial feed stream.

DESCRIPTION OF THE DRAWINGS

The advantages of the present techniques are better understood by referring to the following detailed description and the attached drawings, in which.

DETAILED DESCRIPTION

Figure 1:
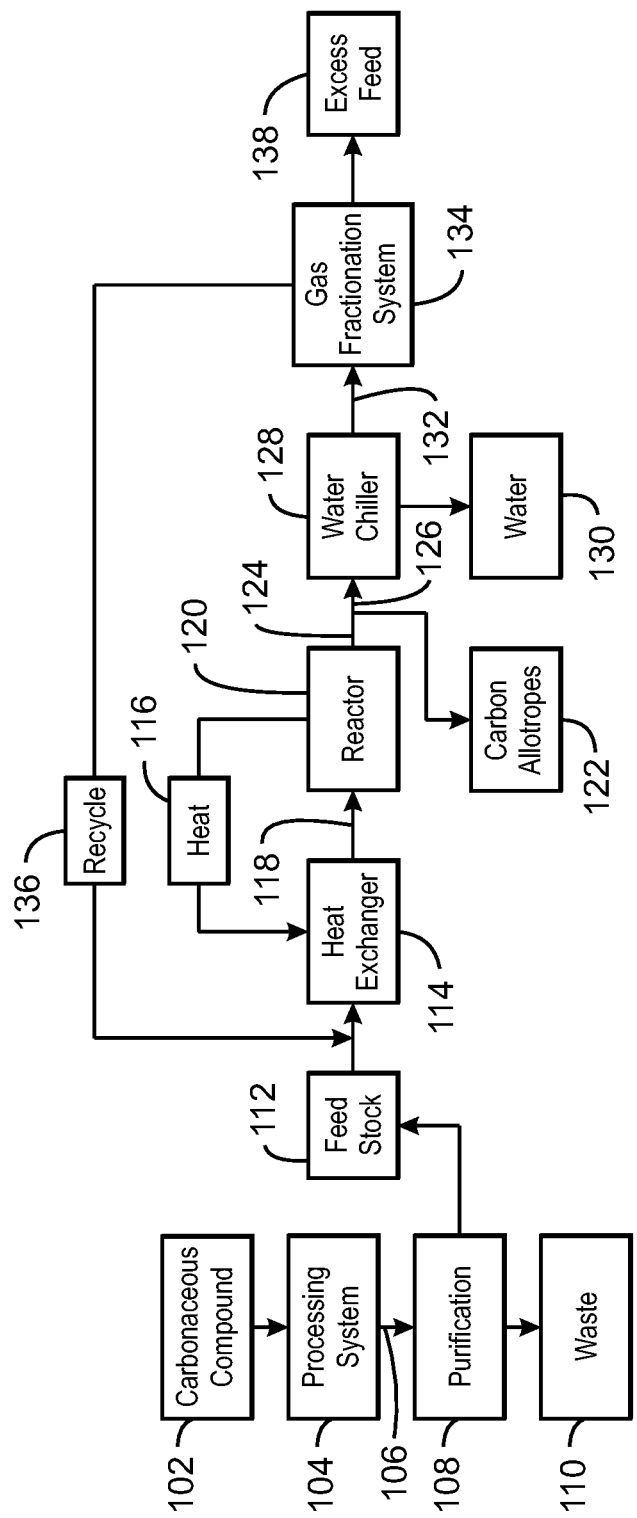
FIG. 1 is a block diagram of a reaction system that generates carbon structures, for example, from feedstocks generated in a waste treatment process.

In the following detailed description section, specific embodiments of the present techniques are described. However, to the extent that the following description is specific to a particular embodiment or a particular use of the present techniques, this is intended to be for exemplary purposes only and simply provides a description of the exemplary embodiments. Accordingly, the techniques are not limited to the specific embodiments described below, but rather, include all alternatives, modifications, and equivalents falling within the spirit and scope of the appended claims.

At the outset, for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

An "acid gas removal unit" broadly refers to any suitable device or equipment to separate at least a portion of an acid gas stream from another process stream, such as a hydrogen or hydrocarbon containing stream. Acid gas broadly refers to a gas or vapor that contains hydrogen sulfide, carbon dioxide, other similar contaminants, or the like. Desirably, the acid gas removal unit can separate or form a hydrogen stream, a purified syngas stream, or hydrocarbon stream, and an acid gas stream. The acid gas removal unit may also separate the acid gas stream into one or more components or constituents, such as into a carbon dioxide stream and a hydrogen sulfide stream. The acid gas removal unit may include any suitable device or equipment, such as pumps, valves, pipes, compressors, heat exchangers, pressure vessels, distillation columns, control systems, and the like. According to one embodiment, the acid gas removal unit includes one or more absorber towers and one or more stripper towers. The acid gas removal unit may recover or separate any suitable amount of acid gas from a process stream, such as at least about 50 percent (%), at least about 75%, at least about 85%, at least about 90%, at least about 95%, at least about 99%, or the like on a mass basis, a volume basis, a mole basis, or the like. The acid gas removal unit may include solvent based Rectisol systems from Linde AG, Munich, Germany, or Lurgi GmbH, Frankfurt, Germany, methanol systems, alcohol systems, amine systems, promoted amine systems, hindered amine systems, glycol systems, ether systems, potassium carbonate systems, water scrubbing systems, other suitable solvents, and the like. Other systems may be used, including direct distillation, such the Controlled Freeze Zone, Ryan/Holmes, bulk fractionation processes, or a combination of both.

"Biomass" refers to any material of organic origin, including, but not limited to, pulp and paper waste, wood products such as shredded bark, wood chips or sawdust, sewage and sewage sludge, food waste, plant matter, rice straw, agricultural and animal waste, such as manure, cellulosic type industrial waste (e.g., construction waste), waste wood, fresh wood, remains from fruit, vegetable and grain processing, and grass.

Figure 3:
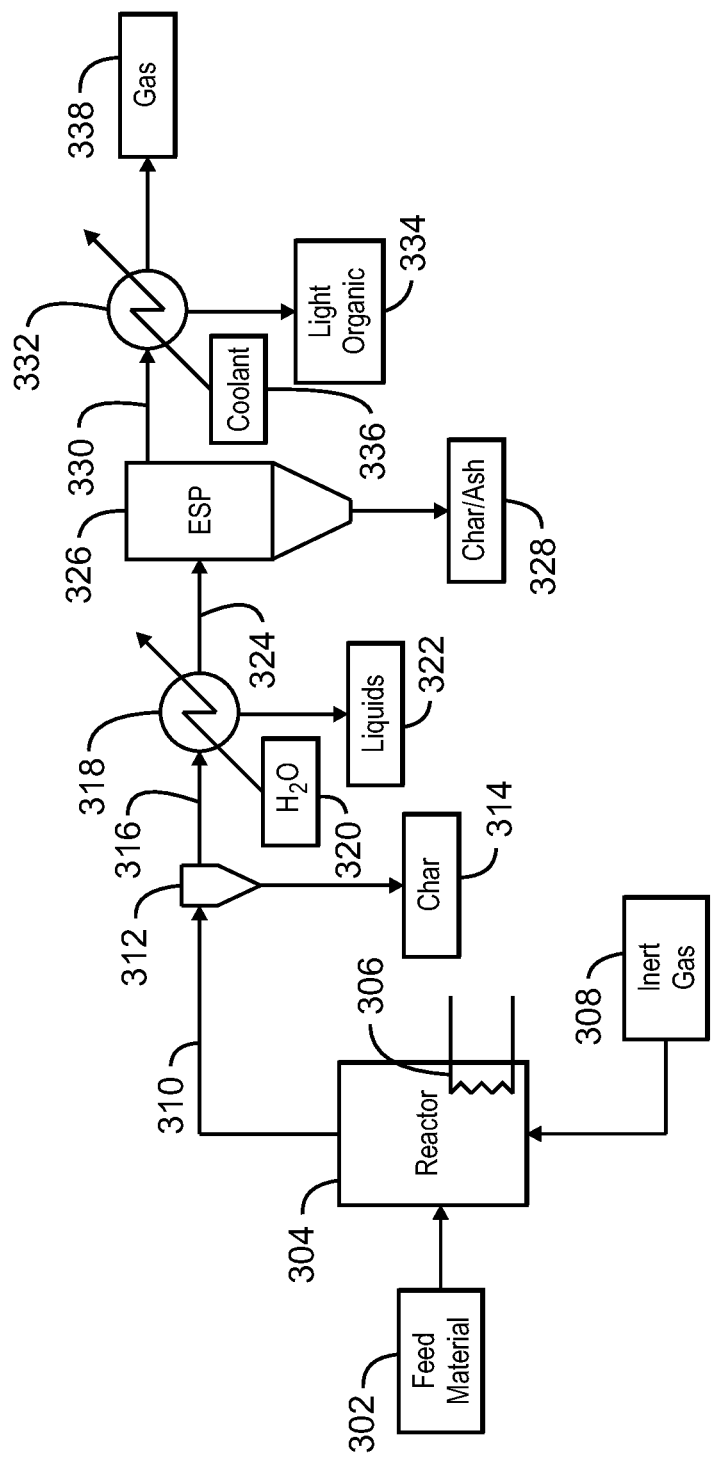
FIG. 3 is a simplified process flow diagram of a pyrolysis system that can be used to generate feedstocks for forming CNTs.

"Carbonaceous feedstock" and "feedstock", are defined to refer to carbonaceous material that can be used in a pyrolysis or gasification system, for example, as discussed with respect to FIG. 3. Examples of suitable feedstock include, but are not limited to, fossil fuel based feedstocks, such as bitumen, coal, oil shale, kerogen, coke (including petroleum coke or "petcoke" and kerogen coke) and heavy oils, as well as other carbonaceous feedstocks, such as: biomass; hazardous and non-hazardous waste materials, including municipal solid waste (MSW); wastes produced by industrial activity; biomedical wastes; carbonaceous material inappropriate for recycling, including non-recyclable plastics; sewage sludge; heavy refinery residuals; refinery wastes; hydrocarbon contaminated solids; agricultural wastes; and any mixtures thereof. The feedstock may be provided as a mixture of two or more of the above feedstocks in various relative proportions.

Carbon fibers, nanofibers, and nanotubes are allotropes of carbon that have a cylindrical structure, which can be in the nanometer range. Carbon nanofibers and nanotubes are members of the fullerene structural family, which includes the spherical carbon balls termed "Buckminster fullerene." The walls of the carbon nanotubes are formed from sheets of carbon in a graphene structure. As used herein, nanotubes may include single wall nanotubes and multiple wall nanotubes of any length. It can be understood that the term "carbon allotropes" as used herein and in the claims, includes all allotropes of carbon, such as carbon fibers, carbon nanofibers, and other carbon nanostructures, as well as graphenes, graphite, and amorphous carbon.

A "compressor" is a device for compressing a working gas, including gas-vapor mixtures or exhaust gases, and includes pumps, compressor turbines, reciprocating compressors, piston compressors, rotary vane or screw compressors, and devices and combinations capable of compressing a working gas. In some embodiments, a particular type of compressor, such as a compressor turbine, may be preferred. A piston compressor may be used herein to include a screw compressor, rotary vane compressor, and the like.

"Cracking" refers to a process involving decomposition and molecular recombination of organic compounds to produce a greater number of molecules than were initially present. In cracking, a series of reactions take place accompanied by a transfer of hydrogen atoms between molecules. For example, naphtha may undergo a thermal cracking reaction to form ethylene (ethene) and $H_2$ among other molecules.

As used herein, a "plant" is an ensemble of physical equipment in which chemical or energy products are processed or transported. In its broadest sense, the term plant is applied to any equipment that may be used to produce energy or form a chemical product. Examples of facilities include polymerization plants, carbon black plants, natural gas plants, and power plants.

A "hydrocarbon" is an organic compound that primarily includes the elements hydrogen and carbon, although nitrogen, sulfur, oxygen, metals, or any number of other elements may be present in small amounts. As used herein, hydrocarbons generally refer to components found in natural gas, oil, or chemical processing facilities.

As used herein, the term "natural gas" refers to a multi-component gas obtained from a crude oil well or from a subterranean gas-bearing formation. The composition and pressure of natural gas can vary significantly. A typical natural gas stream contains methane ($CH_4$) as a major component, i.e., greater than 50 mol % of the natural gas stream is methane. The natural gas stream can also contain ethane ($C_2H_6$), higher molecular weight hydrocarbons (e.g., $C_3$-$C_{20}$ hydrocarbons), one or more acid gases (e.g., hydrogen sulfide), or any combination thereof. The natural gas can also contain minor amounts of contaminants such as water, nitrogen, iron sulfide, wax, crude oil, or any combination thereof. The natural gas stream may be substantially purified prior to use in embodiments, so as to remove compounds that may act as poisons.

A "low-BTU natural gas" is a gas that includes a substantial proportion of $CO_2$ as harvested from a reservoir. For example, a low BTU natural gas may include 10 mol % or higher $CO_2$ in addition to hydrocarbons and other components. In some cases, the low BTU natural gas may include mostly $CO_2$.

As used herein, an "oxygenate" is any compound that primarily includes carbon, hydrogen, and oxygen. Oxygenates include, for example, alcohols, ketones, aldehydes, carboxylic acids, and any number of other compounds.

Overview

Embodiments described herein provide systems and methods for making carbon fibers, nanofibers, and nanotubes (CNTs) on an industrial scale using feedstocks that can include mixtures of carbon oxides and hydrocarbons, among others. In some embodiments, the feedstocks are higher in hydrocarbons, such as $CH_4$, while in other embodiments, the feedstocks are higher in carbon oxides, such as $CO_2$. Other feedstocks may be used, including mixtures of $H_2$, CO, $CO_2$, and other hydrocarbons. The process is conducted under high temperature and pressure conditions using a Bosch reaction, as discussed with respect to FIG. 2.

The process may be slightly exothermic, energy neutral, or slightly endothermic. Accordingly, at least a portion of the heat from the reaction can be recovered and used to heat the feed gases, providing a portion of the heat used by the process during continuous operations. As a high pressure process is used, an ambient temperature heat exchanger is sufficient for the removal of water vapor from the product stream, without using cryogenic coolers. After separation of the product and water formed during the reaction, a gas fractionation system is used to separate any remaining amounts of the limiting reagent from a waste gas mixture and recycle this reagent to the process.

As used herein, an ambient temperature heat exchanger can include water chillers, air coolers, or any other cooling system that exchanges heat with a source that is at substantially ambient temperature. It can be understood that ambient temperature is substantially the temperature of the outside air at the location of the facility, e.g., ranging from about −40° C. to about +40° C., depending on the location of the facility. Further, different types of ambient temperature heat exchangers may be used depending on current ambient temperature. For example, a facility that uses water chillers in a summer season may use air coolers in a winter season. It can be understood that an appropriate type of heat exchanger may be used at any point herein that describes the use of an ambient temperature heat exchanger. The ambient temperature heat exchangers may vary in type across the plant depending on the amount of cooling needed.

Embodiments described herein can be used to produce industrial quantities of carbon allotropes such as fullerenes, carbon nanotubes, carbon nanofibers, carbon fibers, graphite, carbon black, and graphene, among others, using any number of carbonaceous feedstocks as the carbon source. The balance of the possible products may be adjusted by the conditions used for the reaction, including catalyst compositions, temperatures, pressures, feedstocks, and the like. In a reactor system, the carbon oxides are catalytically converted to solid carbon and water. The carbon oxides may be obtained from numerous sources, including the atmosphere, combustion gases, process off-gases, well gas, and other natural and industrial sources.

The carbonaceous feedstocks can be treated, for example, by cracking or gasification, to generate lower molecular weight feedstocks. The lower molecular weight feedstocks may include liquids that can be vaporized, or gaseous feedstocks.

For example, treatment of the carbonaceous compound can produce a gaseous feedstock such as a carbon oxide, e.g., carbon dioxide ($CO_2$) or carbon monoxide (CO), and a reducing agent, e.g., methane ($CH_4$) or other hydrocarbons, hydrogen ($H_2$), or combinations thereof. A hydrocarbon gas can act as both an additional carbon source and as the reducing agent for the carbon oxides. The treatment process may produce syngas, that may form a portion of the feed. These gases can also be used as the reducing agent. Syngas, or "synthetic gas," includes carbon monoxide (CO) and hydrogen ($H_2$) and, thus, includes both the carbon oxide and the reducing gas in a single mixture. Syngas may be used as all or portion of the feed gas.

Carbon oxides, particularly carbon dioxide, are abundant gases that may be extracted from carbonaceous materials, exhaust gases, low-BTU well gas, and from some process off-gases. Although carbon dioxide may also be extracted from the air, other sources often have much higher concentrations and are more economical sources from which to harvest the carbon dioxide. Further, carbon dioxide is available as a by-product of power generation. The use of $CO_2$ from these sources may lower the emission of carbon dioxide by converting a portion of the $CO_2$ into carbon products.

The systems described herein may be incorporated into waste treatment systems or refineries for generating higher value carbon allotropes. For example, waste streams may be treated to form the carbon oxides and hydrocarbons that may be used as feedstocks for this process.

As used herein, an industrial scale process may provide large quantities of carbon allotropes in short periods of time. For example, the techniques used herein may provide carbon allotropes in quantities greater than about 0.5 Kg/hr, greater than about 1 Kg/hr, greater than about 2 Kg/hr, greater than about 5 Kg/hr, greater than about 10 Kg/hr, greater than about 100 Kg/hr, or greater than 1000 Kg/hr. The amounts produced depend on the scale of the equipment and the catalysts chosen.

FIG. 1 is a block diagram of a reaction system 100 that generates carbon allotropes, for example, from feedstocks generated in a waste treatment process. In the reaction system 100, a carbonaceous compound 102 is treated in a processing system 104 to form a hydrocarbon stream 106.

The hydrocarbon stream 106 may contain compounds having other elements besides carbon, hydrogen, and oxygen, such as sulfur compounds or metal compounds. Many of these compounds may act as poisons to the catalytic reaction used to form carbon allotropes, or may be too high in molecular weight to act as an effective feedstock. For example, the processing of tires can form hydrogen sulfide, which can act as a poison in the process. Similarly, the processing of fibrous plant materials, e.g., containing large amounts of lignites, can also release sulfur compounds. Thus, the hydrocarbon stream 106 may be treated in a purification system 108 to remove problematic compounds. The purification system 108 can create a waste material 110, which can be discarded or used as a feedstock for additional chemical processing. The purification system 108 generates a feedstock 112, which may be used to generate carbon nanotubes.

The feedstock 112, is not limited to materials formed by the processes above, but may include any hydrocarbon or oxygenate that is capable of being mixed to form a blend. The mole ratios of elements in the feedstocks may vary, generally including materials that have a 1:1 ratio of carbon to oxygen and a 2:1 ratio of hydrogen to oxygen. As one example, the feedstock formed may be a mixture of $CO_2$ and $CH_4$, which has a mole ratio of 2C:2O:4H or 1:1:2. These ratios are merely exemplary, and any number of other elemental ratios may be used. Generally, the mole ratio of carbon in the feedstock 112 will be higher than the mole ratio of oxygen, e.g., greater than 1:1, and the mole ratio of hydrogen will be greater than twice the mole ratio of oxygen, e.g., greater than 2:1.

In some embodiments, a higher concentration of carbon oxides, such as CO or $CO_2$ are used, while in other embodiments, hydrocarbons, such as $CH_4$, are at a higher concentration. Other components may be present in the feedstock 112, such as $C_2H_6$, $C_2H_4$, and the like. In one embodiment, the feedstock 112 has been treated to remove these components, for example, in the purification system 108. The feedstock may also include oxygenates.

The feedstock 112 is passed through a heat exchanger 114 to be heated for reaction. The heating may also vaporize any liquid in the feedstock 112, as discussed with respect to FIG.

9. During continuous operation, a portion of the heating is provided using heat 116 recovered from the reaction. The remaining heat for the reaction may be provided by an auxiliary heater, as described below. During start-up, the auxiliary heater is used to provide the total heat to bring the feed to the appropriate reaction temperature, e.g., about 500° C. (about 930° F.). In one embodiment, the feed is heated to between about 500° C. (about 932° F.) to about 550° C. (about 1022° F.). In another embodiment, the feed is heated to between about 700° C. (about 1292° F.) to about 750° C. (about 1382° F.). In another embodiment, the feed is heated to between about 800° C. (about 1472° F.) to about 850° C. (about 1562° F.). The heated feed gas 118 is fed to a reactor 120.

In the reactor 120, a catalyst reacts with a portion of the heated feed gas 118 to form carbon allotropes 122 using the Bosch (or Bosch like Reverse Gasification) reactions. As described in more detail below, the reactor 120 can be a fluidized bed reactor that uses any number of different catalysts, including, for example, metal shot, supported catalysts, and the like. The carbon allotropes 122 are separated from the flow stream 124 out of the reactor 120, leaving a waste gas stream 126 containing excess reagents and water vapor. At least a portion of the heat from the flow stream 124 is used to form the heated feed gas 118 prior to the flow stream 124 entering the chiller as waste gas stream 126.

The waste gas stream 126 is passed through an ambient temperature heat exchanger, such as water chiller 128, which condenses out the water 130. The resulting dry waste gas stream 132 is used as a feed stream for a gas fractionation system 134. It can be understood that a dry waste gas stream, as used herein, has the bulk of the water removed, but may still have small amounts of water vapor. For example, the dew point of a dry waste gas stream may be greater than about −5° C., greater than about 0° C., greater than about 5° C., greater than about 10° C., greater than about 20° C., or higher. A dryer may be used to lower the dewpoint, for example, to about −50° C., about −70° C., or lower, prior to gas fractionation.

The gas fractionation system 134 removes a portion of the reagent having the lower concentration in the feedstock 112 and recycles it to the process, for example, by blending a recycle stream 136 with the feed gas 112. The higher concentration gas in the feed gas 112 can be disposed of as excess feed 138, for example, by sales to downstream users. As an example, if $CO_2$ is the highest concentration gas in a blend with $CH_4$, the gas fractionation system 134 can be used to remove $CH_4$ or syngas remaining in the waste gas stream, and send it back into the process as recycle 136. The process functions as an equilibrium reaction between the reagents and solid carbon, as discussed further with respect to FIG. 2. The gas fractionation system 134 may not be needed when the $CH_4$ and syngas components, CO & $H_2$ are in excess, as much of the $CO_2$ may be consumed in the reaction. Thus, the excess feed 138 that contains the $CH_4$, and that may also contain $H_2$, CO, and other gases, may be used to generate power in a power plant or used as a fuel for other purposes without further purification or gas separation, as discussed with respect to FIG. 1C.

Figure 2:
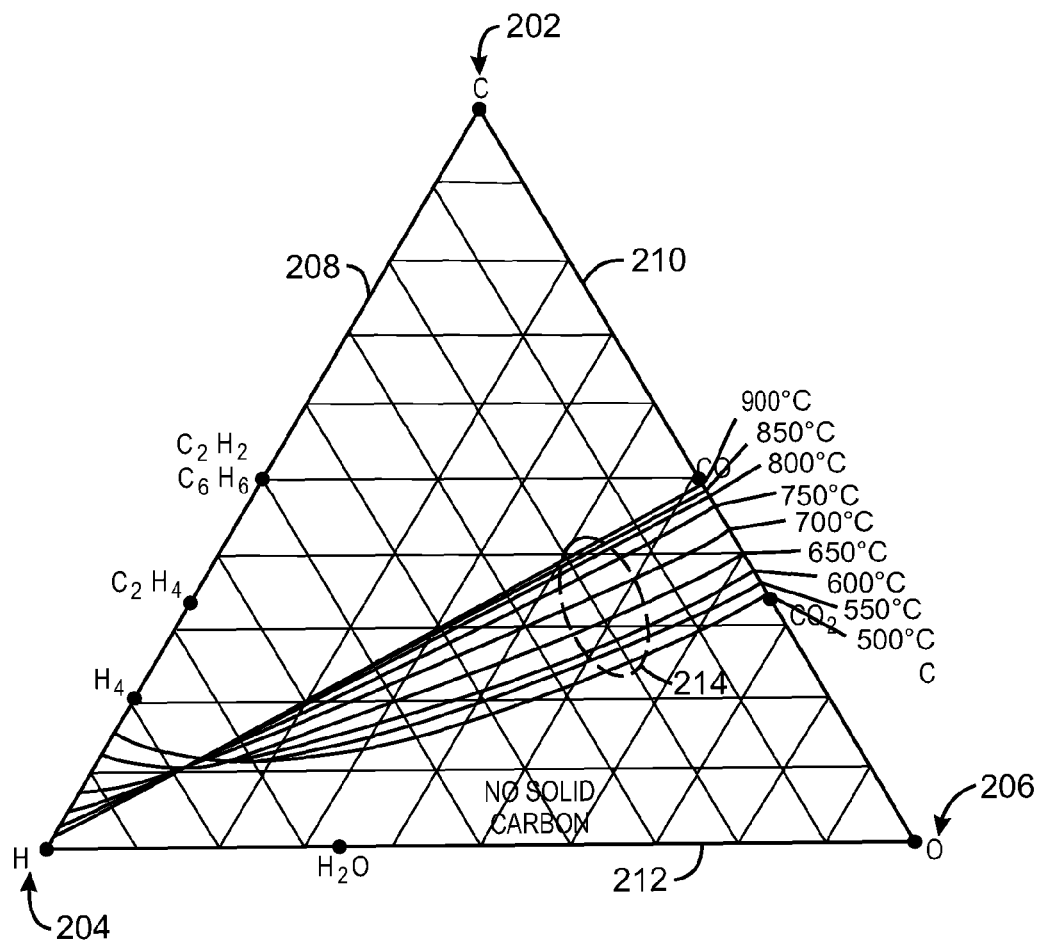
FIG. 2 is a C—H—O equilibrium diagram of the equilibria between carbon, hydrogen, and oxygen, indicating species in equilibrium at various temperature conditions.

FIG. 2 is an equilibrium diagram that identifies conditions under which a solid carbon product will form. This diagram is a triangular diagram 200 with the elements, C 202, H 204, and O 206, at the apexes of the triangle. As one moves from any location towards an apex the molar ratio of the element, C 202, H 204, and O 206, increases. In this way all of the possible compositions of the three elements can be mapped onto the triangular diagram 200.

Any chemical compound, or mixture, with any two or all these three elements can be mapped onto the triangular diagram 200 as indicated by the exemplary points marked. Some of the chemical compounds include hydrocarbons such as alkanes, alkenes and alkynes as well as many other types of hydrocarbons. The hydrocarbons are located on the C—H edge 208 connecting C 202 and H 204. Chemical compounds that include only the elements C 202 and O 206, including carbon monoxide (CO) and carbon dioxide ($CO_2$), occur along the C—O edge 210 connecting C 202 and O 206. Chemical compounds that include only the elements H 204 and O 206, such as water ($H_2O$), occur along the H—O edge 212 connecting H 204 and O 206.

In the central region of the triangular diagram 200 are chemical compounds and mixtures that have all three elements, C 202, H 204, and O 206. For example, these chemical compounds may include a very large number of individual components, such as alcohols, aldehydes, ethers, and materials with more complex structures, such as carbohydrates. Further, mixtures of compounds such as hydrogen, carbon oxides, and hydrocarbons may also be present.

Some of the first experiments to form fullerenes, $C_{60}$ and $C_{70}$, as well as carbon nanotubes (CNTs) were performed by laser ablation of a carbon electrode, capturing the carbon material in a mass spectrometer. The curves 214 shown in FIG. 2 show the limit of carbon production at various temperatures. These curves 214 were determined by performing a stoichiometrically constrained Gibbs minimization, which minimizes the Gibbs free energy of the resulting compounds based on the constraint that the amount of carbon, oxygen and hydrogen are to be the same both before and after the reaction. The point where solid carbon formation occurs for the first time was noted as the composition was moved from a first composition point to a second composition point on the triangular diagram 200.

In thermodynamic terms, the curves 214 identify the points where the activity of carbon is about 1.0. Above a carbon activity of about 1.0, solid carbon forms, in the center region, while below the carbon activity of about 1.0, no solid carbon forms. The triangle diagram 200 is useful for identifying the conditions where carbon allotropes, such as carbon nanotubes (CNTs) can possibly be produced, as well as determining compounds and mixtures that can be used for their production.

At the temperatures indicated in FIG. 2, most hydrocarbons, and other organic compounds, undergo thermal decomposition to produce small, thermodynamically stable, gas molecules, such as CO, $CO_2$, $CH_4$, $H_2O$, $H_2$, and the like. Under certain reaction conditions, these small gas molecules can react to produce carbon allotropes. In some cases, the carbon allotropes will be in the form of CNTs. Both single walled and multi-walled CNTs of various dimensions and chiralities can be made in these ways.

Pyrolysis Reaction Systems

FIG. 3 is a simplified process flow diagram of a pyrolysis system 300 that can be used to generate feedstocks for forming CNTs. In the pyrolysis system 300, a feed material 302 can be fed to a pyrolysis reactor 304. The feed material may include any number of carbonaceous materials, such as shredded tires, sawdust, plant wastes, refinery wastes, and the like. Heaters 306 heat the pyrolysis reactor 304 to between 1000° C. and 2500° C., between about 1200° C. and about 2000° C., or between about 1500° C. and 1700° C., and an inert gas 308 is injected to sweep degradation products 310 from the reactor 304. It can be understood that a pyrolysis system may be referred to as a gassifier.

A cyclonic separator 312 may be used to remove larger particles of carbon or char 314, as well as any other debris, from the degradation products 310. After the char 314 is removed, the resulting flow 316 can be sent through a heat exchanger 318, for example, to be cooled by chilled water 320. The cooling condenses heavier liquids 322, including, for example, materials with a boiling point greater than about 20° C., about 30° C., about 40° C., or about 50° C. The liquids 322 may be sold as a separate stream. In some embodiments, a portion of the liquids 322 may be combusted to provide the heat for the heaters 306. The liquids 322 may also be recycled to the reactor 304 for further degradation to form lower molecular weight compounds.

The resulting gas stream 324 can be further treated to remove fine particles that passed through the cyclonic separator 312. For example, an electrostatic precipitator (ESP) 326 can be used to remove fine particles, such as char and ash 328. The cleaned gas stream 330 can be flowed through another heat exchanger 332 to condense light organic compounds 334. The coolant system 336 may be a glycol system providing temperatures down to about 150° C. Using this system, alkanes such as butanes, or even propane, may be removed from the cleaned gas stream 330. The resulting gas stream 338 may be mostly methane, sulfur compounds, and carbon oxides, depending on the oxygen and sulfur content of the feed material. The char 314 may be combusted with oxygen to form carbon oxides, which can be combined into the gas stream 338 to form the feedstock. In some embodiments, the char 314 is reacted with steam to form a syngas, which is a mixture of CO, $H_2$, and other impurities. The syngas can also be combined with the gas stream 338 to form the feedstock.

In some embodiments, other cooling systems may be used to provide lower temperatures, such as, for example, a cryogenic system capable of providing temperatures down to about −100° C., or about −150° C., or lower. At those temperatures, removal of carbon dioxide and hydrogen sulfide may be performed. If these temperatures are not used, the resulting gas stream 338 can be purified to remove the hydrogen sulfide prior to use, as discussed with respect to FIG. 4.

Embodiments are not limited to pyrolysis, as any number of other techniques may be used to generate the feedstock. For example, a gassifier may be used to generate syngas from a feed material. In this process, the material is directly reacted with oxygen, steam, or both, to form the syngas.

Purification Systems

Any number of purification systems may be used to remove compounds that include elements other than C, H, and O. Compounds including these elements may poison the catalyst in the CNT reaction, either lowering the efficiency or causing the formation of less valuable carbon allotropes. Systems that can be used include amine scrubbers to remove sulfur compounds as discussed further with respect to FIG. 4. Other processes, such as a direct distillation process, may also be used.

Figure 4:
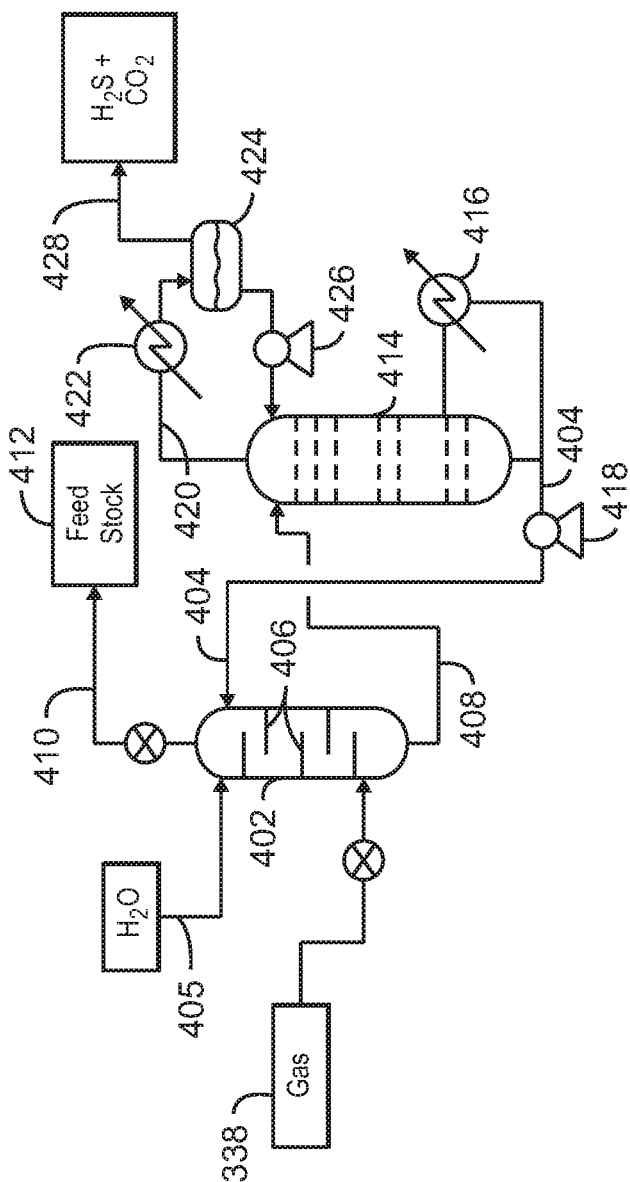
FIG. 4 is a simplified process flow diagram of an amine adsorbent system that can be used to remove hydrogen sulfide from a gas stream.

FIG. 4 is a simplified process flow diagram of an amine adsorbent system 400 that can be used to remove hydrogen sulfide from a gas stream 336. The gas stream 336 is injected into an amine contactor 402 near the bottom. A lean amine stream 404 is injected into the top of the amine contactor 402. A makeup water stream 405 is also injected into the amine contactor 402, controlling the concentration of an aqueous solution in the amine contactor 402. Any number of amine compounds may be used in the amine absorbent system 400, including monoethylamine, diethylamine, methyldiethylamine, monoethanolamine, diisopropylamine, and aminoethoxyethanol, among others. The concentration of the amine in water depends on the amine used and the compound targeted. For example, a concentration of about 20% monoethanolamine may be used to remove both $H_2S$ and $CO_2$, while a concentration of about 32% may target the removal of $CO_2$. Other amine concentrations and types may be used to target removal of $H_2S$ only.

A series of plates 406 (or packing not shown) may be used to improve mixing in the amine contactor 402, by forcing a cross current contact of the gas 336 with the amine 404. The purified gas stream 410 leaves the top of the amine contactor 402 and can be used to provide the feedstock 412 for forming carbon allotropes.

A rich amine stream 408, i.e., having an enhanced concentration of leaves the contactor from the bottom. The rich amine stream 408 is fed to a stripping column 414 to remove the sulfur compounds. A reboiler 416 heats the stripping column 414. A portion of the liquid from the stripping column 414 is fed to a pump 418, which provides the lean amine stream 404 back to the amine contactor 402 via cooler 403. An overhead stream 420 is passed through a chiller 422 to condense liquids. The stream is then fed to a phase separator 424. The liquid phase is passed through a pump 426 for reinjection into the stripping column 414. The gas stream 428 from the phase separator 424 includes $CO_2$ and $H_2S$, which may be disposed, for example, in an injection well, or may be used as a feedstock for further chemical processes, such as the Claus process used to make elemental sulfur. A small portion of the water may be removed in the overhead stream 410 and the gas stream 428, and more makeup water 405 can be injected to adjust the concentration. Stream 408 and 404 may transfer heat in an optional heat exchange step prior to the lean stream entering cooler 403. In addition, there may be a flash drum 409 used on the rich stream at an intermediate pressure level to reject gas stream 409A to reduce the load on the stripping column 414.

Embodiments are not limited to amine scrubbing for the purification process, but may use any number of other processes to remove compounds that have elements other than carbon, hydrogen, and oxygen. For example, a staged cryogenic separation process may be used to remove various compounds at various stages. A first, warmer, stage may remove liquid hydrocarbons, such as propane, butanes, hexanes, and the like. A second, colder, stage may then be used to remove $CO_2$ and $H_2S$ from the gas. Other systems that may be used to remove impurities include activated carbon beds, for example, using the char 328 from the pyrolysis system 300 of FIG. 3. Other systems that can be used may be based on zeolites or molecular sieves. As mentioned, Selexol, Rectisol, or other physical solvents, may also be used to remove sulfur impurities.

Reactor Systems

Figure 5:
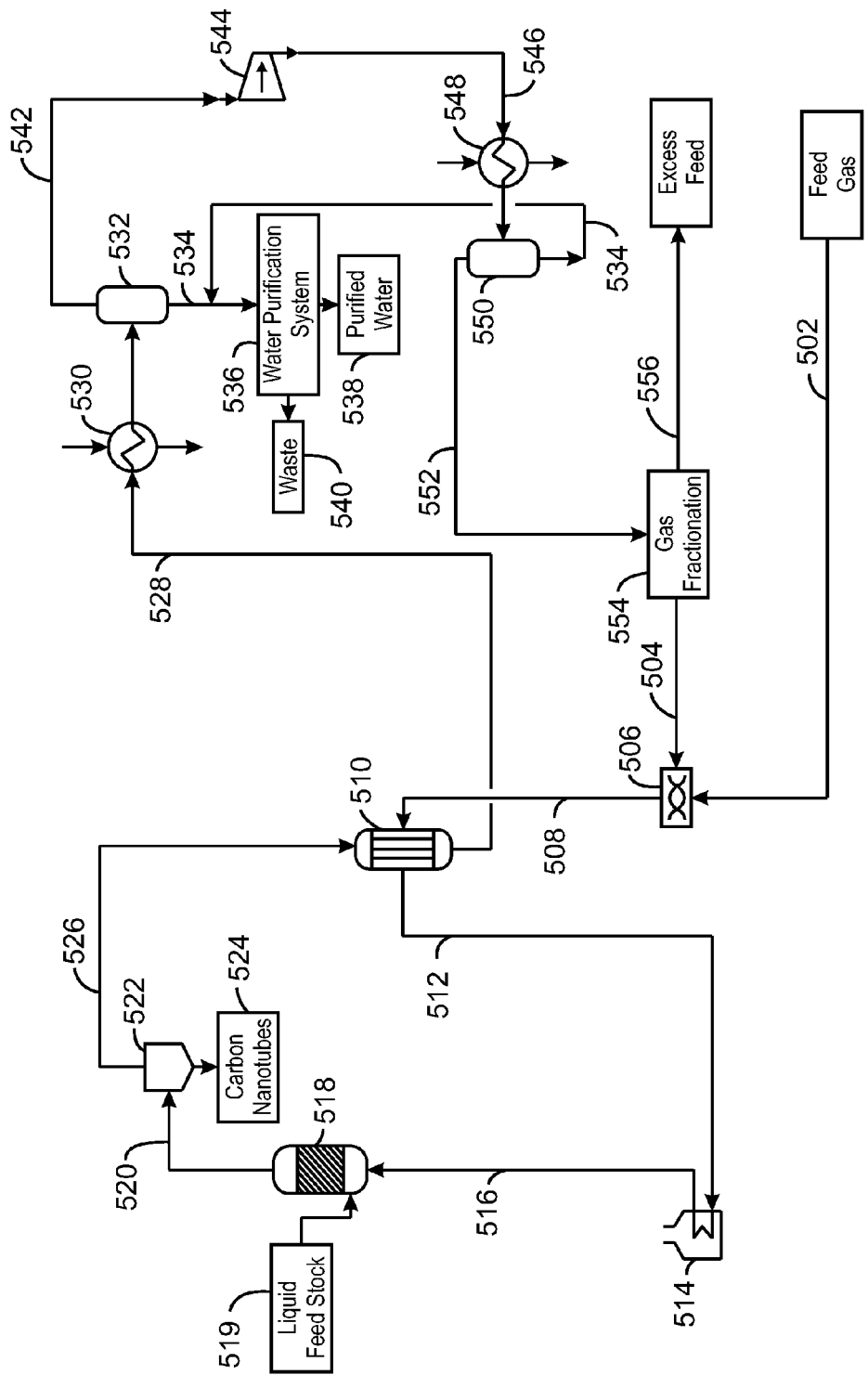
FIG. 5 is a simplified process flow diagram of a one reactor system for making carbon allotropes from a gas feed that includes carbon dioxide and methane.

FIG. 5 is a simplified process flow diagram of a one reactor system 500 for making carbon allotropes from a gas feed that includes carbon dioxide and methane. As shown, the one reactor system 500 can be used for feed gas 502 that is higher in carbon oxides or higher in hydrocarbons, such as the gaseous feedstock 412 provided by the amine adsorbent system 400 of FIG. 4. In the reaction system 500, the feed gas 502 is combined with a recycle gas 504 that has an enhanced concentration of the lesser gas. The mixing can be performed using a static mixer 506.

The combined gas stream 508 is passed through a heat exchanger 510 or set of heat exchangers 510 in series to be heated by a reactor effluent stream. The temperature can be raised from a near ambient temperature, as defined herein, to an appropriate reaction temperature, such as about 500° C. (930° F.), about 600° C. (about 1112° F.), about 700° C. (about 1292° F.), about 800° C. (about 1472° F.), or about 900° C. (about 1652° F.) for the heated gas stream 512. This temperature may be sufficient for maintaining the reaction during continuous operations. However, part of the heat may be provided by a package heater 514, which may be especially useful for adding heat to bring the reactants up to temperature during start-up. The hot gas stream 516 is then introduced into a fluidized bed reactor 518. A general fluidized bed reactor that may be used in embodiments is discussed with respect to FIG. 7. As noted previously, the feedstocks are not limited to gaseous feedstock 412, but may include liquid feedstocks 519 that are vaporized and injected directly into the reactor 518, for example, provided as the light liquids 322 or the light organic liquids 334 from the gasification process 300.

The carbon allotropes are carried from the fluidized bed reactor 518 in a reactor effluent stream 520. The reactor effluent stream 520 may be at an elevated temperature, for example, about 600° C. (about 1112° F.), about 700° C. (about 1292° F.), about 800° C. (about 1472° F.), or about 900° C. (about 1652° F.), and may be cooled by exchanging heat with the combined gas stream 508, for example, providing some or all of the heat used to heat the reactants. Either prior to or after cooling, the reactor effluent stream 520 is passed through a separation device 522, such as a cyclonic separator, to remove the carbon allotropes 524. The resulting waste gas stream 526 can used to provide heat to the combined gas stream 508 in the heat exchanger 510. The carbon allotropes may also be removed in secondary separation devices (not shown) at lower temperatures than the waste gas stream 526.

After providing heat to the combined gas stream 508, the cooled waste stream 528 is passed through an ambient temperature heat exchanger 530 and then fed to a separation vessel 532. Water 534 settles in the separation vessel 532 and is removed from the bottom. The water 534 may then be fed into a water purification system 536. The water purification system 536 may produce a purified water stream 538, as well as a waste stream 540.

The water purification system 536 may be used to remove carbon allotropes from the cooled waste stream 528 through a number of separation techniques. In various embodiments, the water purification system 536 may be configured to produce a carbon oxide from the carbon allotropes within the water 534. In some embodiments, an air sparging process may be used to effect a separation of the carbon allotropes from the water 534.

The resulting gas stream 542 from the separation vessel 532 may be significantly cooler, for example, at about 30° C., about 38° C. (about 100° F.), or about 40° C. and at a pressure of about 2500, kiloPascals (kPa), about 3000 kPa, about 3720 kPa (about 240 psia), or about 4000 kPa. In one embodiment, the gas is then dried to a low dew point in a drier (not shown). The stream enters a compressor 544 that increases the pressure of the gas stream 542, for example, to about 5000 kPa, about 6000 kPa, about 7000 kPa, about 7,240 kPa (about 1050 psia), or about 8000 kPa, forming a high pressure stream 546, which is passed through another ambient temperature heat exchanger 548. From the ambient temperature heat exchanger 548, the high pressure stream 546 is fed to a separation vessel 550 for removal of any remaining water 534, for example, if a drier has not been used. The water 534 may be combined with the water 534 from the separation vessel 532 and fed into the water purification system 536.

In embodiments in which the carbon oxides, such as $CO_2$, are in excess in the feed gas 502, the dried gas stream 552 can be sent to a gas fractionation system 554, which separates the excess feed 556 from the recycle gas 504. In reaction systems 500 based on a proportionate excess of $CO_2$, the excess feed 556 may primarily include $CO_2$, and the recycle gas 504 may primarily include $CH_4$. In reaction systems 500 based on a proportionate excess of $CH_4$, the excess feed 556 will not have a substantial $CO_2$ content, and a portion may be recycled without further purification, for example, replacing the gas fractionation system 554 with a manifold. In some embodiments, a portion of the excess feed 556, the recycle gas 504, or both may be used to provide a fuel gas stream, a purge gas stream, or both for use in the plant.

Figure 6:
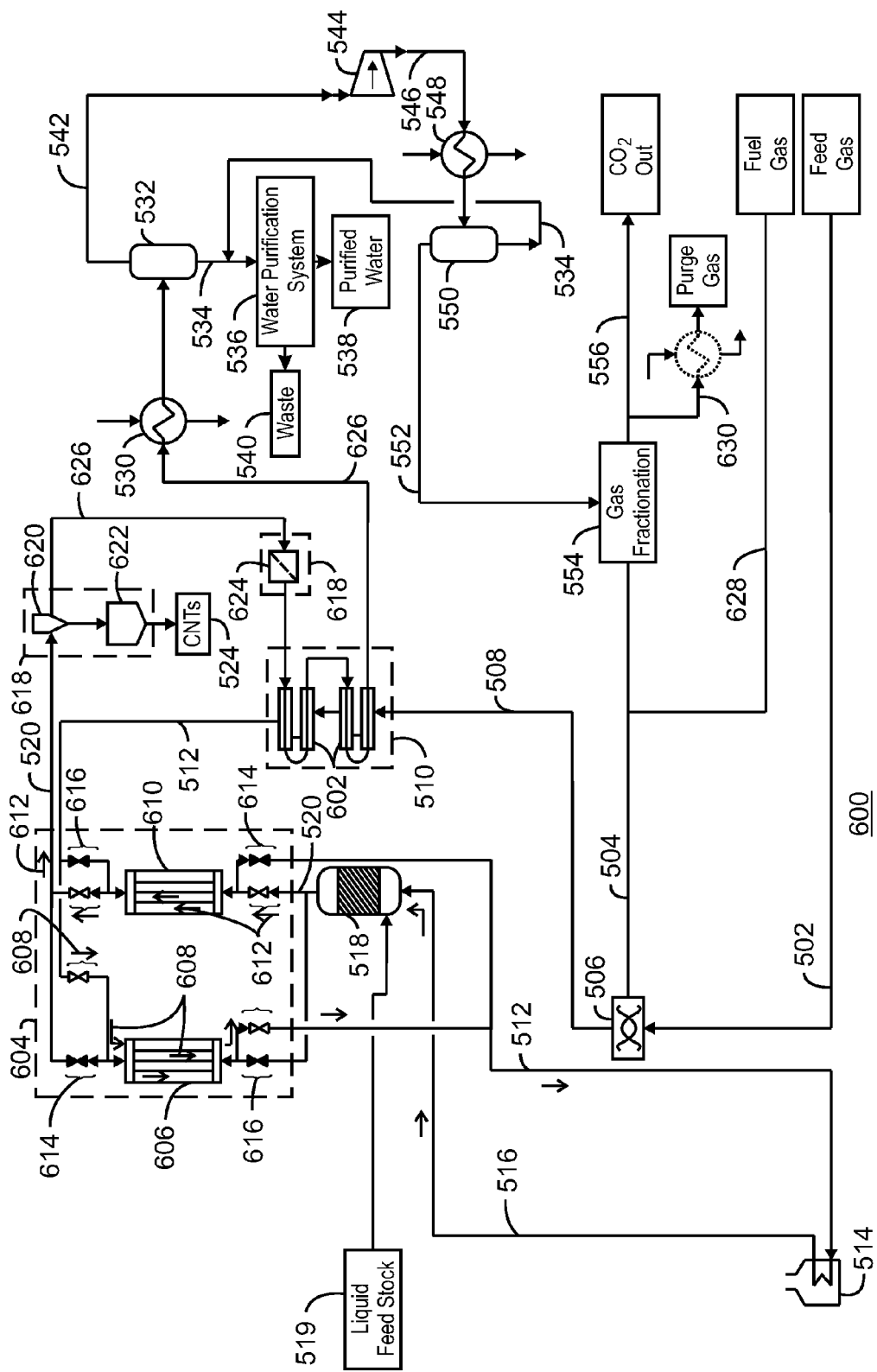
FIG. 6 is another simplified process flow diagram of a one reactor system for making carbon allotropes from a gas feed that includes carbon oxides, hydrocarbons, or oxygenates.

FIG. 6 is another simplified process flow diagram of a one reactor system 600 for making carbon allotropes from a gas feed that includes carbon oxides, hydrocarbons, or oxygenates. In FIG. 6, like number items are as described with respect to FIG. 5. As described with respect to FIG. 5, the feed gas 502 passes through a static mixer 506 where it is combined with a recycle gas 504, which is high in methane. The combined gas stream 508 is passed through a heat exchanger 510, for example, including multiple shell and tube heat exchangers 602. The main difference between the more detailed process flow diagram of FIG. 6 and that of FIG. 5 is the use of heat exchangers to cool the reactor effluent stream 520 prior to separating the carbon allotropes from the reactor effluent stream 520.

In this embodiment, the heated gas stream 512 is raised to a temperature of about 300° C., about 400° C., about 427° C. (about 800° F.), or about 500° C. in the heat exchanger 510 prior to flowing through a second heat exchanger 604. In the second heat exchanger 604, the heated gas stream 512 flows through a first ceramic block heat exchanger 606, as indicated by arrows 608. Heat stored in the first ceramic block heat exchanger 606 is exchanged to the heated gas stream 512 and may increase the temperature to between about 500° C. (about 932° F. and to about 550° C. (about 1022° F.). In another embodiment, the feed is heated to between about 700° C. (about 1292° F.) to about 750° C. (about 1382° F.). In another embodiment, the feed is heated to between about 800° C. (about 1472° F.) to about 850° C. (about 1562° F.).

While the first ceramic block heat exchanger 606 is used to heat the heated gas stream 512, a second ceramic block heater 610 is used to cool the reactor effluent stream 520 by flowing this stream through the second ceramic block heater 610, as indicated by arrows 612. When the second ceramic block heat exchanger 610 reaches a selected temperature, or the first ceramic block heat exchanger 606 drops to a selected temperature, the positions of the inlet valves 614 and outlet valves 616 are changed. In other words, open valves are closed and closed valves are opened. The change in the positions of the valves changes which ceramic block heat exchanger 606 or 610 is being heated by the flow from the reactor 518, as well as which ceramic block heat exchanger 606 or 610 is used to heat the heated gas stream 512.

The heat exchangers 510 and 604 may also be used to vaporize the liquid feedstock 519 in preparation for injection into the reactor 518. For example, a portion of each ceramic block heat exchanger 606 and 610 in the second heat exchanger 604 may have a flow path dedicated to flashing the liquid feedstock 519 to a vapor. The liquid flows through the ceramic block heat exchangers 606 and 610 may be reversed, as described for the gas flows above, as the ceramic block heat exchangers 606 and 610 cool.

The recycle heat may not be sufficient to increase the temperature of the heated gas stream 512 for reaction. Thus, as described with respect to FIG. 5, a package heater 514 can be used to further boost the temperature of the heated gas stream 512, forming the hot gas stream 516, which can be fed to the fluidized bed reactor 518. Carbon allotropes are formed in the fluidized bed reactor 518, and carried out in the reactor effluent stream 520.

After flowing through the second ceramic block heater 610, the reactor effluent 520 is flowed to a separation system 618, which is used to remove the carbon allotropes from the reactor effluent 520. In this embodiment, the separation system 618 for the carbon allotropes includes a cyclonic separator 620, a lock hopper 622, and a filter 624. After the majority of the carbon allotropes are removed by the cyclonic separator 620 and deposited into the lock hopper 622, the filter 624 is used to remove remaining carbon allotropes from the waste gas stream 626. This may help to prevent plugging, or other problems, caused by residual carbon allotropes in the waste gas stream 626. The filter 624 can include bag filters, sintered metal filters, and ceramic filters, among other types. From the separation system 618, the carbon allotropes may be directed to a packaging system. After the filter 624, the waste gas stream 626 is flowed through the heat exchanger 510 before flowing to the ambient temperature heat exchanger 530 and then fed to a separation vessel 532 for separation of the water 534. After flowing through the separation vessel 532, the flow is as described with respect to FIG. 5.

The individual streams 504 and 556 can be used to supply other gases for the process. For example, a fuel gas stream 628 may be removed from the high methane recycle gas 504 and used for powering turbines, boilers, or other equipment in order to provide power to the system 600 or to an electric grid. Further, a purge gas stream 630 may be removed from the $CO_2$ waste stream 556. The purge gas stream 630 may be used for cooling and purging the carbon allotropes during packaging. The purge gas may also be used for various cleaning functions in the plant, such as blowing residual carbon allotropes out of a ceramic heat exchanger 606 or 610 when flow is reversed.

A similar plant configuration may be used for a high hydrocarbon feed gas. In this case, however, a gas fractionation system may not be needed, as the resulting gas can be directly recycled without further treatment. Further, the recycle and effluent waste streams can contain substantial quantities of hydrogen and carbon monoxide, e.g., greater than about 1 mol % each, about 5 mol % each, about 10 mol % each, or about 20 mol % of each component. These components will generally be present in the feed and all non-$CO_2$ product streams, i.e., the recycle methane will always contain some CO and $H_2$.

Figure 7:
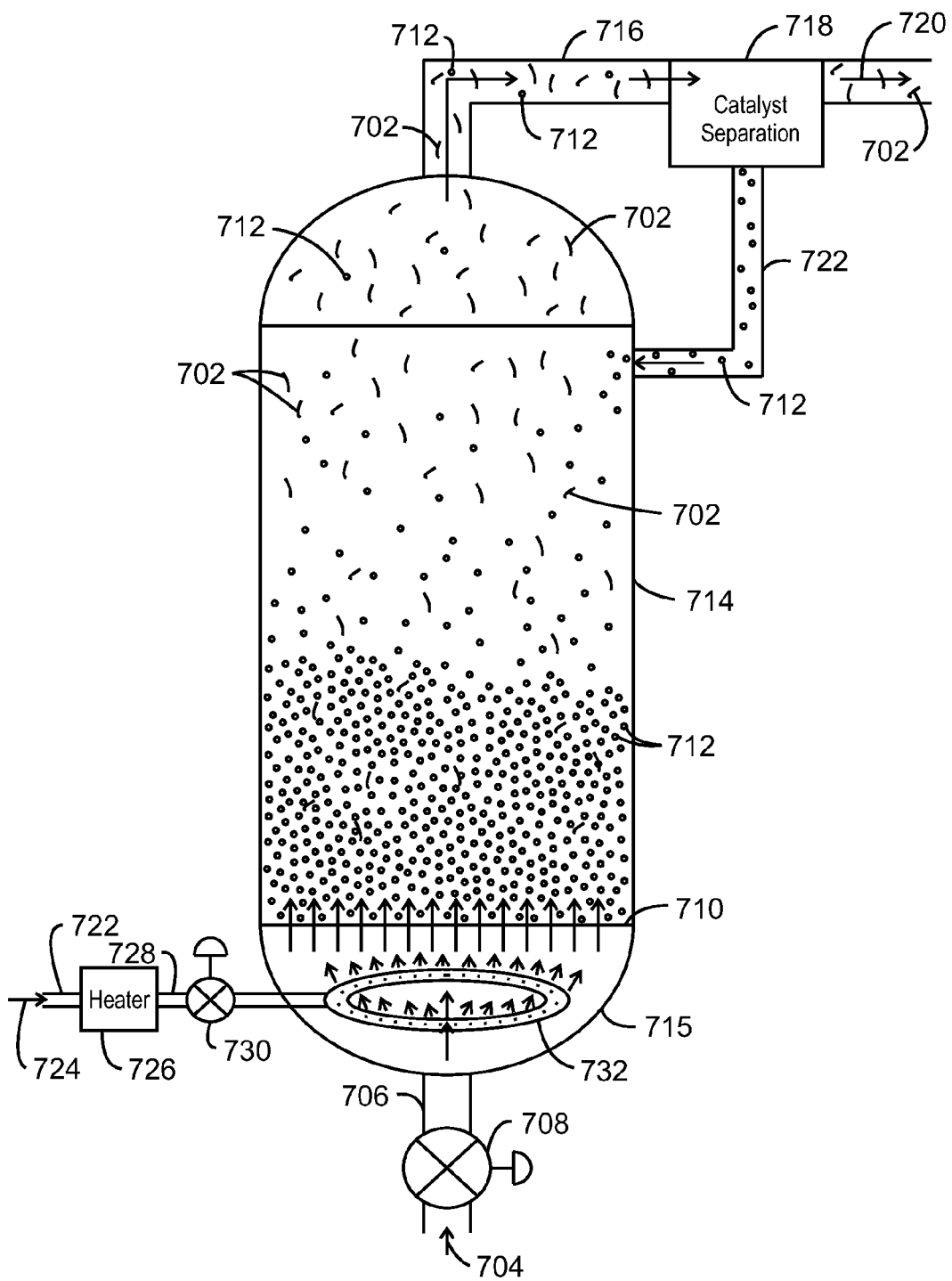
FIG. 7 is a drawing of a fluidized bed reactor for forming carbon allotropes, such as carbon nanotubes.

FIG. 7 is a drawing of a fluidized bed reactor 700 for forming carbon allotropes, such as carbon nanotubes 702. A hot gas feed stream 704 is fed through a line 706 into the bottom of the fluidized bed reactor 700. A control valve 708 may be used to regulate the flow of the hot gas feed stream 704 into the reactor. The hot gas feed stream 704 flows through a distributor plate 710 and will fluidize a bed of catalyst beads 712 held in place by the reactor walls 714. As used herein, "fluidize" means that the catalyst beads 712 will flow around each other to let gas bubbles through, providing a fluid-like flow behavior. As discussed herein, the reaction conditions are very harsh to any exposed metal surface, as the metal surface will perform as a catalyst for the reaction. Thus, the reaction will result in the slow degradation of an exposed metal surface. Accordingly, the interior surface of the fluidized bed reactor 700, including the reactor walls 714 and heads 715, as well as the distributor plate 710, and other parts, can be made of a non-reactive material, such as ceramic or gold, to protect the surfaces.

As the hot gas feed stream 704 flows through the fluidized bed of catalyst particles 712, CNTs 702 will form from catalyst beads 712. The flowing hot gas feed stream 704 carries the CNTs 702 into an overhead line 716 where they are removed from the fluidized bed reactor 700. Depending on the flow rate, for example, as adjusted by the control valve 708, some amount of catalyst beads 712, or particles fragmented from the catalyst beads 712, may be carried into the overhead line 716. Accordingly, a catalyst separator 718 may be used to separate catalyst beads 712, and larger particles, from a reactor effluent stream 720 and return them to the fluidized bed reactor 700 through a recycle line 722. Any number of configurations may be used for the catalyst separator 718, including a cyclonic separator, a settling tank, a hopper, and the like.

In addition to the hot gas feed stream 704 flowing in from the bottom of the fluidized bed reactor 700, an additional line 722 may be used to add a liquid feed stream 724 to the fluidized bed reactor 700. The liquid feed stream 724 can be vaporized in a heater 726, which may use recovered heat from the reaction to vaporize the liquid feed stream 724. For example, the heater 726 may be a separate flow section of the ceramic block heat exchangers 606 and 610, described with respect to FIG. 6. The vaporized feed stream 728 may be metered into the reactor through a control valve 730, and injected into the hot gas feed stream 704 through a distribution ring 732. The reactions that take place in the fluidized bed are discussed in more detail in FIG. 8.

Figure 8:
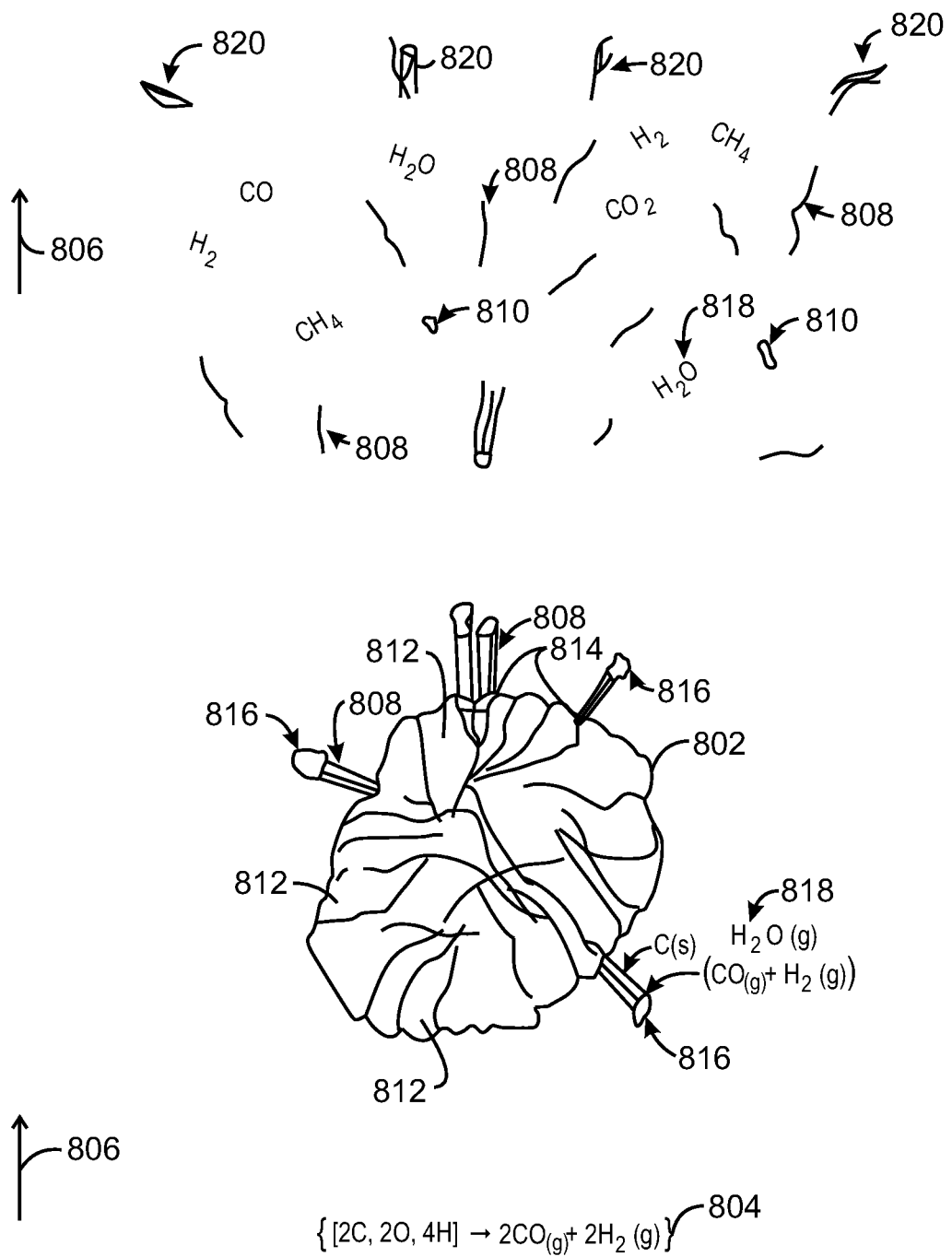
FIG. 8 is a schematic of a catalytic reaction for the formation of carbon allotropes, such as carbon nanotubes, on a catalyst bead.

FIG. 8 is a schematic of a catalytic reaction 800 for the formation of carbon allotropes, such as carbon nanotubes, on a catalyst bead 802. An initial reaction 804 between a portion of the compounds in a feed stream 806 results in the formation of CO and $H_2$ in stoichiometric amounts. In some embodiments, a syngas that includes CO and $H_2$ may be used as the reactor feedstock, in which case, the initial reaction 804 may not occur. In other cases, various combinations of hydrocarbons, carbon oxides, and $H_2$ may be used. In some embodiments, the ratio between C and O in the feedstock is about 1:1, and the molar ratio of O to H is about 1:2. As noted, the amounts are not fixed at these ratios, for example, the ratio of C to O may be greater than 1:1, and the ratio of O to H may be less than 1:2. As an example, the feedstock may include an equal amount of $CH_4$ and $CO_2$. The feedstock may also include $CH_4$, $CO_2$, CO, and $H_2$, for example, as a portion of recycle gas is used.

However, the feedstock is not limited to these components, as any materials that provide the basic component elements for the Bosch reaction in the appropriate ratios may be used. These compounds may include hydrocarbons or oxygenates, including any combinations of alkanes, alkenes, alkynes, alcohols, aldehydes, carboxylic acids, ketones, carbon oxides, hydrogen, $H_2O$, and others. Examples of compounds that may be used include ethane, ethene (ethylene), ethyne (acetylene), propane, butanes, pentanes, hexanes, methanol, ethanol, propanols, butanols, pentanols, methyl ethyl ketone (MEK), methyl methyl ketone (actetone), and many others. Generally, the liquid feedstocks will be vaporized prior to introduction to the reactor to prevent the heat of vaporization from lowering the temperature in the reactor.

Excess amounts of the feed stream 806 continue to flow through the reactor, helping to fluidize the bed and carrying away CNTs 808 and catalyst particles 810. The reactions that form the CNTs 808 take place on the catalyst bead 802. The size of the CNTs 808, and the type of CNTs 808, e.g., single wall or multiwall CNTs 808, may be controlled by the size of the grains 812. Without being limited by theory, a nucleus of iron atoms of sufficient size at the grain boundary may form the nucleating point for the growth of the carbon products on the catalyst bead 802. Generally, smaller grains 812 will result in fewer layers in the CNTs 808, and may be used to obtain single wall CNTs 808. Other parameters may be used to affect the morphology of the final product as well, including reaction temperature, pressure, and feed gas flow rates.

The CO and $H_2$ react at grain boundaries 814, lifting active catalyst particles 816 off the catalyst bead 802, and forming $H_2O$ 818 and the solid carbon of the CNTs 808. The CNTs 808 break off from the catalyst bead 802 and from the catalyst particle 810. Larger catalyst particles 810 can be captured and returned to the reactor, for example, by the catalyst separator 718 discussed with respect to FIG. 7, while very fine catalyst particles 810 will be carried out with the CNTs 808. The final product may about 70 mol % solid carbon and about 15 mol % metal, about 80 mol % solid carbon and about 10 mol % metal, about 90 mol % solid carbon and about 7 mol % metal, or about 95 mol % solid carbon and about 5 mol % metal. The CNTs 808 will often agglomerate to form clusters 820, which are the common form of the final product. Some amount of the CO and $H_2$ passes through the reactor without reacting and are contaminants in the reactor effluent streams. Although some amount of lower carbon number hydrocarbons, such as methane, may also flow through the reactor, larger carbon number hydrocarbons, such as $C_2s$, $C_3s$, and the like, may be degraded to methane or carbon oxides before exiting the reactor. The reactor effluent will also contain water formed in the reaction.

As the reaction proceeds, the catalyst bead 802 is degraded and finally consumed. Accordingly, the reaction may be described as a metal dusting reaction. In some embodiments, metal surfaces are protected from attack by a protective lining, such as ceramic or gold, since the metal surfaces in contact with the reaction conditions would not only degrade, but may also result in the formation of poorer quality products.

In addition to iron, the catalyst bead 802 can include any number of metals from different IUPAC Groups on the periodic table, such as Group 10 (e.g., nickel), Group 8 (e.g., iron or ruthenium), Group 9 (e.g., cobalt), or Group 6 (e.g., chromium or molybdenum), among others. Other metals that may be present include Group 7 metals (e.g., manganese), or Group 5 metals (e.g., cobalt), among others. It can be understood that the metals listed above are merely exemplary of the Groups mentioned and other metals from those Groups may be included. However, the catalytic sites on the catalyst beads 802 are principally composed of iron atoms. In one embodiment, the catalyst bead 802 includes metal shot, for example, about 25-50 mesh metal beads that are used for shot blasting. In one embodiment, the catalyst may be a stainless ball bearing, and the like.

Gas Fractionation System

Figure 9:
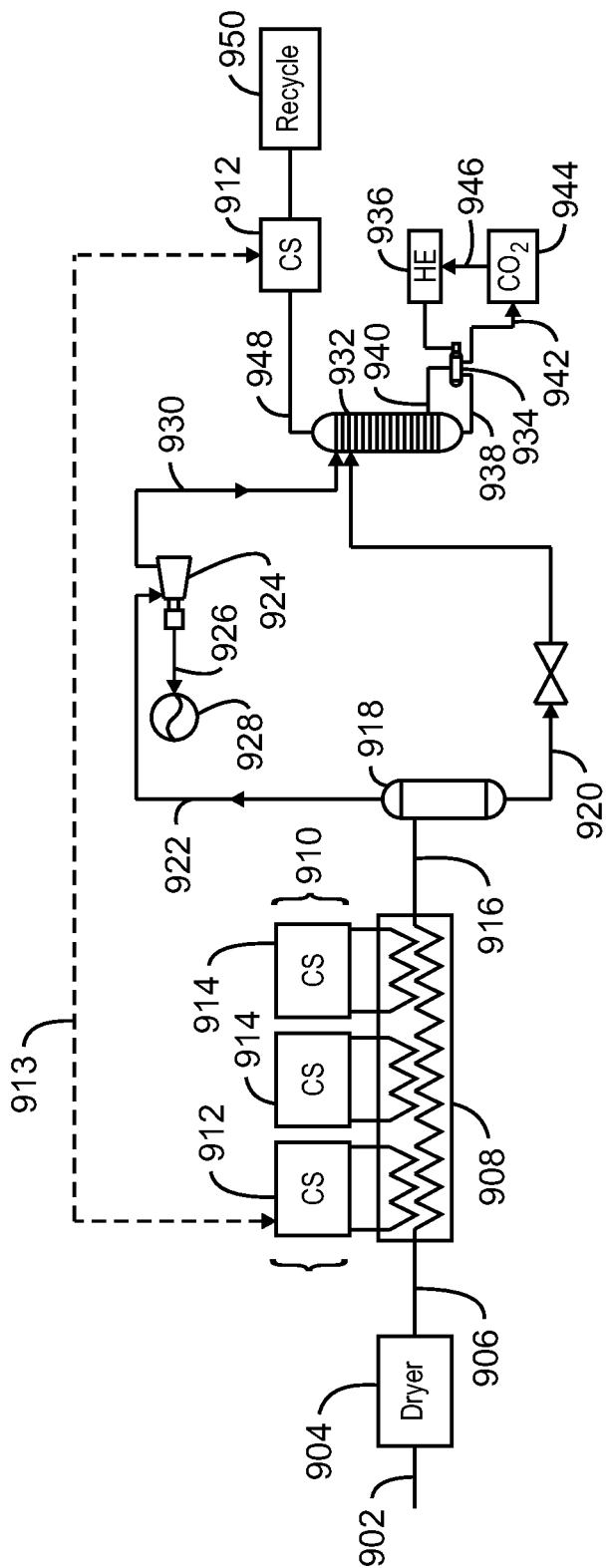
FIG. 9 is a simplified process flow diagram of a gas fractionation system that can be used in a reactor system for the production of carbon allotropes, such as carbon nanotubes.

FIG. 9 is a simplified process flow diagram of a gas fractionation system 900 that can be used in a reactor system for the production of carbon nanotubes. The gas fractionation system 900 is a bulk fractionation process that may be used with a high $CO_2$ reactor system, such as that discussed with respect to FIG. 6. Further, the gas fractionation system 900 may be used to purifying a gas stream formed in a gassifier, such as the system discussed with respect to FIG. 3.

In the gas fractionation system 900, the feed gas 902 is fed to a dryer 904 to reduce the dew point to about −40° C., about −50° C., about −56.7° C. (about −70° F.), about −60° C., about −70° C., about −80° C., or lower. The feed gas 902 can correspond to the dried gas stream 552 discussed with respect to FIGS. 5 and 6 or may be the gaseous feedstock 338 described with respect to FIG. 3. The dryer 904 can be a fixed or fluidized dryer bed, containing an adsorbent, such as molecular sieves, desiccants, and the like. Other dryer technologies may also be used, such as cryogenic drier systems. In some embodiments, the dryer can be located prior to the compressor 358, which may eliminate the need for the ambient temperature heat exchanger 362.

The dry gas feed 906 is then fed through a cryogenic chiller 908 to reduce the temperature in preparation for the separation. As $CO_2$ will condense from the gas at about −61° C. (about −77° F.), a multistage chilling system 910 may be used to reduce the temperature to around this level. The multistage chilling system 910 may include a heat recovery system 912 used to heat the outlet gas with energy 913 from the dry feed gas 906. The multistage chilling system 910 may also include other refrigeration systems 914, such as medium pressure propane chillers and high pressure propane chillers.

The chilled feed 916 is fed to a separation vessel 918 to separate a liquid stream 920 and a vapor stream 922. The vapor stream 922 is passed through an expander 924 to lower the temperature by generating mechanical work 926 in an adiabatic expansion process. In one embodiment, the mechanical work 926 is used to drive a generator 928, which may provide a portion of the electricity used in the plant. In another embodiment, the mechanical work 926 is used to drive a compressor, for example, for compressing a refrigerant stream for the multistage chilling system 910. The expansion can result in a two phase stream 930.

The liquid stream 920 and the two phase stream 930 are fed to a separation column 932, for example, at different points along the separation column 932. Heat is supplied to the separation column 932 by a reboiler 934. The reboiler 932 is heated by a stream from a heat exchanger 936. In practice, one or more side reboilers in addition to the column reboiler may be used to meet the column heat duty. The heat exchanger 936 may be part of a chiller system that is warmer than the separation column 932, although below ambient temperature. The column bottom stream 938 is passed through the reboiler 934 and a portion 940 is reinjected after being warmed. An outlet stream 942 from the reboiler 934 provides the $CO_2$ product 944. A portion 946 of the $CO_2$ product 944 may be recycled through the heat exchanger 936 to carry energy to the reboiler 934 or another heat exchanger used a side reboiler.

The overhead stream 948 from the separation column 932 is a methane enhanced stream, for example, including about 55 mol % $CH_4$ and about 40 mol % $CO_2$, about 60 mol % $CH_4$ and about 35 mol % $CO_2$, about 70 mol % $CH_4$ and about 25 mol % $CO_2$, about 73 mol % $CH_4$ and about 23 mol % $CO_2$, or about 80 mol % $CH_4$ and about 15 mol % $CO_2$. As noted, the overhead stream 948 may be used in a chiller system 912 to cool the dry gas feed 906, warming the overhead stream 948 to form the recycle gas 950. Other components may be present in the recycle gas 950 including, for example, about 1 mol % CO and $H_2$, about 2 mol % CO and $H_2$, about 3.5 mol % CO and $H_2$, about 4 mol % CO and $H_2$, or about 5 mol % CO and $H_2$.

The configurations and units discussed with respect to FIG. 9 are merely exemplary. Any number of variations may be made to these systems. Further, other gas separation systems may be used in embodiments, so long as flow rates and purity levels can be achieved.

Method

Figure 10:
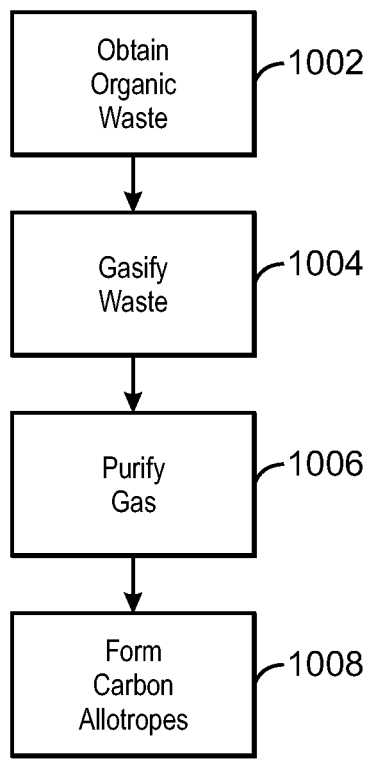
FIG. 10 is a process flow diagram of a method for forming carbon allotropes, such as carbon nanotubes, from a carbonaceous feedstock.

FIG. 10 is a process flow diagram of a method 1000 for forming carbon allotropes, such as carbon nanotubes, from a carbonaceous feedstock. The method begins at block 1002 by obtaining an organic waste. As discussed, the organic waste can include any number of materials, such as shredded tires, organic wastes, refinery wastes, land fill materials and the like.

At block 1004, the wastes are broken down into smaller molecular weight components, such as in a gassifier, a cracker, and the like. At block 1006, the materials from the gasification are further purified, for example, by amine treating as discussed with respect to FIG. 4, or cryogenic separation, as discussed with respect to FIG. 9, among others. Liquid feedstocks formed in the gasification process may be purified by distillation, column separation, amine treating, and the like. At block 1008, the purified feedstocks are used to form carbon allotropes, for example, as discussed with respect to FIG. 11.

Figure 11:
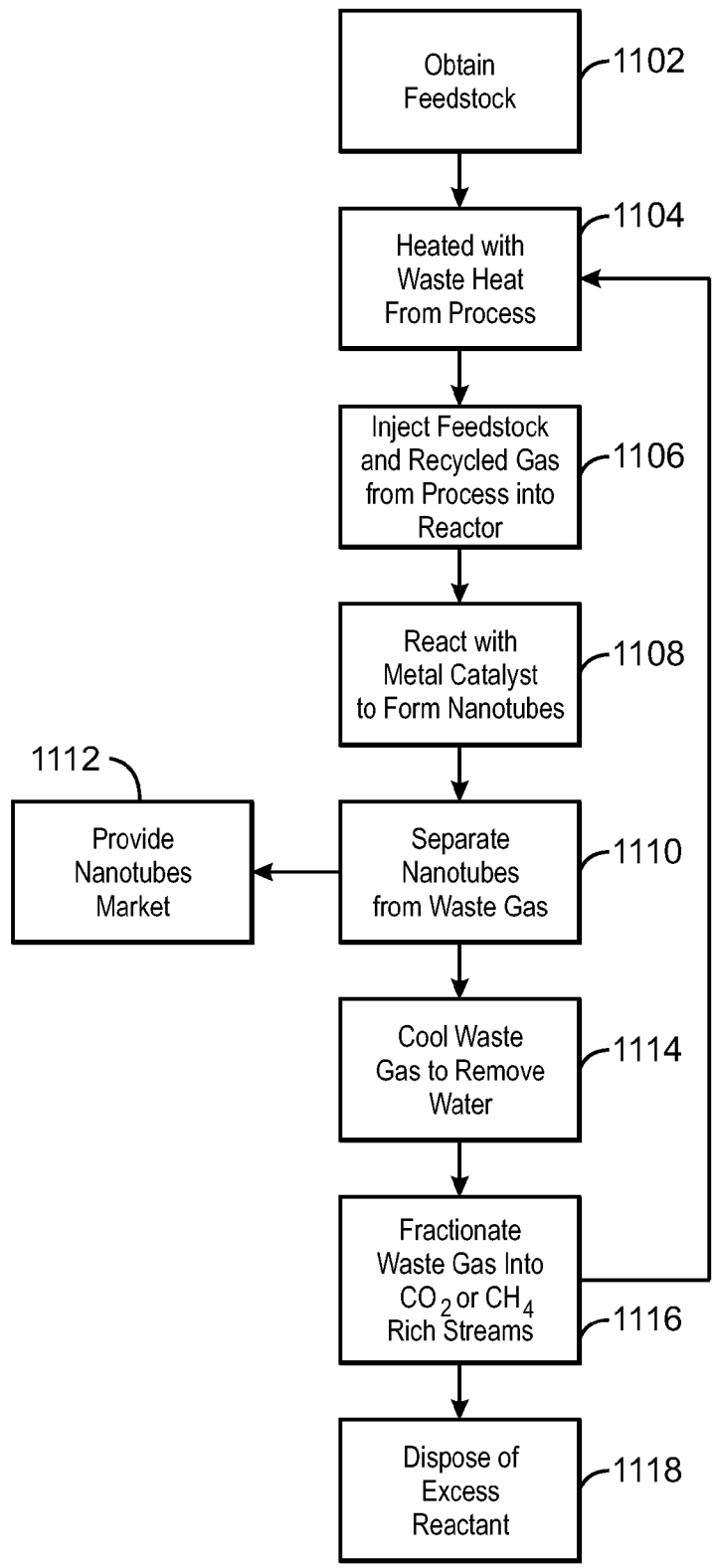
FIG. 11 is a process flow diagram of a method for generating carbon allotropes, such as carbon nanotubes, from a feed gas that can include carbon oxides and hydrocarbons.

FIG. 11 is a process flow diagram of a method 1100 for generating carbon allotropes, such as carbon nanotubes, from a feed gas that can include carbon oxides and hydrocarbons. The method 1100 begins at block 1102, at which a feedstock is obtained. The feedstock may be generated from any number of sources, and may include carbon oxides and low molecular weight hydrocarbons, among others. As mentioned, the feedstock may include gases and liquids formed form treating a carbonaceous material. Further, the feedstock may also include a natural gas harvested from a sub-surface reservoir, an exhaust gas from a power generation plant, or any number of other gases or liquids from natural or plant sources. Further, other feedstocks may be used in embodiments, including other materials, such as syngas, CO, $H_2$, other hydrocarbons, and the like.

At block 1104, the feedstock is heated with waste heat recovered from the reaction process. A recycled gas stream, obtained from the wastes gases generated in the process, can also be heated with waste heat from the reaction. As described herein, the recycle gas may be obtained from the waste gases by cryogenic gas fractionation, as well as any number of other techniques, or may be a directly recycled stream. The heating of the recycle gas may be performed in a separate heat exchanger from the heating or flashing of the fresh feedstock, for example, in the case of a liquid feedstock, or in a mixture with a fresh gaseous feedstock. At block 1106, the feedstock and the recycle gas are injected into the reactor. After heating, at block 1108, the combined gas stream is reacted with a metal catalyst in a reactor to form the CNTs. At block 1110 the CNTs are separated from the waste gas. At block 1112, the separated CNTs are purged, cooled, and packaged to be sent to market. At block 1114, the waste gas is cooled to remove excess water formed during the reaction. As the process is conducted at high temperatures and pressures, an ambient temperature heat exchanger provides sufficient cooling to condense out the water vapor.

At block 1116, the waste gas is fractionated into a $CO_2$ enriched stream and a $CH_4$ enriched stream. At block 1118, whichever stream contains the excess reagent can be sold, while the other stream can be recycled to block 1104 to be used in the process.

Still other embodiments of the claimed subject matter may include any combinations of the elements listed in the following numbered paragraphs:

1. A method for forming carbon allotropes, including:
   treating a carbonaceous compound to form a feedstock including at least about 10 mol % oxygen, at least about 10 mol % carbon, and at least about 20 mol % hydrogen;
   forming carbon allotropes from the feedstock in a reactor in a Bosch reaction at a temperature of at least about 500° C.; and
   separating the carbon allotropes from a reactor effluent stream.

2. The method of paragraph 1, wherein treating the carbonaceous compound includes flashing a liquid into a gas to form the feedstock.

3. The method of paragraphs 1 or 2, wherein treating the carbonaceous compound includes cracking the carbonaceous compound.

4. The method of paragraphs 1, 2, or 3, wherein treating the carbonaceous compound includes steam reforming the carbonaceous compound.

5. The method of any of paragraphs 1-4, wherein treating the carbonaceous compound includes shredding a material.

6. The method of any of paragraphs 1-5, wherein treating the carbonaceous compound includes treating the carbonaceous compound in a gassifier.

7. The method of any of paragraphs 1-6, wherein treating the carbonaceous compound includes removing compounds including elements other than carbon, hydrogen, and oxygen.

8. A system for the production of carbon allotropes, including:
   a carbonaceous compound, wherein the carbonaceous compound is treated to form a feedstock including at least about 10 mol % oxygen, at least about 10 mol % carbon, and at least about 20 mol % hydrogen;
   a feed gas heater configured to heat the feedstock with waste heat from a waste gas stream;
   a reactor configured to form carbon allotropes from the feedstock in a Bosch or Bosch like Reverse Gasification reaction;
   a separator configured to separate the carbon allotropes from a reactor effluent stream forming the waste gas stream; and
   a water removal system, including an ambient temperature heat exchanger and separator configured to separate the bulk of the water from the waste gas stream to form a dry waste gas stream.

9. The system of paragraph 8, wherein the carbonaceous compound includes lignin, lignites, cellulose, plant wastes, wood products, or algae.

10. The system of paragraphs 8 or 9, wherein the wherein the carbonaceous compound includes used tires, recycled plastics, or recycled paper products.

11. The system of paragraphs 8, 9, or 10, wherein the carbonaceous compound includes coal, kerogen, bitumen, oil, natural gas, or natural gas liquids.

12. The system of any of paragraphs 8-11, wherein the carbonaceous compound includes an organic liquid.

13. The system of any of paragraphs 8-12, wherein the carbonaceous compound includes syngas.

14. The system of any of paragraphs 8-13, including a refinery.

15. The system of any of paragraphs 8-14, including a gassifier.

16. The system of any of paragraphs 8-15, wherein the ambient temperature heat exchanger includes a water chiller.

17. The system of any of paragraphs 8-16, wherein the feedstock includes at least about 20 mol % oxygen, at least about 20 mol % carbon, and at least about 40 mol % hydrogen.

18. The system of any of paragraphs 8-17, wherein the feedstock includes carbon dioxide and methane.

19. The system of any of paragraphs 8-18, wherein the feedstock includes carbon monoxide and hydrogen.

20. The system of any of paragraphs 8-19, wherein the ambient temperature heat exchanger includes an air cooled heat exchanger.

21. The system of any of paragraphs 8-20, including a package heater configured to heat the feedstock.

22. The system of any of paragraphs 8-21, including:
a compressor configured to increase the pressure of the dry waste gas stream; and
a water removal system configured to remove water from the dry waste gas stream.

23. The system of any of paragraphs 8-22, including a system configured to adjust the composition of the feedstock.

24. The system of paragraph 23, including a system configured to mix a methane rich stream, or a $CO_2$ rich stream, or both, with a recycle gas stream to form the feedstock.

25. The system of any of paragraphs 8-24, wherein the reactor is a fluidized bed reactor using a bottom fed flow of feedstock to fluidize a catalyst.

26. The system of any of paragraphs 8-25, including a gas fractionation system configured to separate a methane rich stream and a $CO_2$ rich stream from the waste gas stream.

27. The system of any of paragraphs 8-26, including a mixing system configured to mix the methane rich stream into the feed gas before the feed gas heater.

28. A reaction system for forming carbon nanotubes, including:
a treatment system configured to form a feedstock from a carbonaceous compound, wherein the feedstock includes at least about 10 mol % oxygen, at least about 10 mol % carbon, and at least about 20 mol % hydrogen;
a purification system configured to remove compounds including elements other than carbon, hydrogen, and oxygen from the feedstock;
a feed heater upstream of the reactor, wherein the feed heater is configured to convert the feedstock to a gaseous stream and to heat the feedstock prior to injection into a reactor;
a reactor configured to form carbon nanotubes from the gaseous stream using a Bosch or Bosch like Reverse Gasification reaction;
a separation system downstream of the reactor, wherein the separation system is configured to remove carbon nanotubes from an effluent from the reactor;
a feed heater downstream of the separation system, wherein the feed heater includes a heat exchanger configured to heat a feed gas stream for a following reactor using waste heat from the effluent from the reactor;
an ambient temperature heat exchanger downstream of the feed heater, wherein the ambient temperature heat exchanger is configured to remove water from the effluent, forming a waste stream;
a compressor configured to increase the pressure of the waste stream;
an ambient temperature heat exchanger downstream of the compressor, configured to remove water from the waste stream;
a gas fractionation system configured to separate the waste stream into a methane enriched stream and a carbon dioxide enriched stream; and
a mixer configured to blend the methane enriched stream or the carbon dioxide enriched stream into an initial feed stream.

29. The reaction system of paragraph 28, including a package heater configured to heat an initial feed stream.

30. The reaction system of paragraph 29, wherein the package heater is used to heat a feed stream to a subsequent reactor.

31. The reaction system of paragraph 29, wherein the package heater is a heater configured to be field erected, or an electric power heater, a commercial heater configured for heating gases, or any combinations thereof.

32. The reaction system of paragraph 29, wherein the package heater is configured to heat a reducing gas stream without substantial damage.

While the present techniques may be susceptible to various modifications and alternative forms, the embodiments discussed above have been shown only by way of example. However, it should again be understood that the techniques is not intended to be limited to the particular embodiments disclosed herein. Indeed, the present techniques include all alternatives, modifications, and equivalents falling within the true spirit and scope of the appended claims.

What is claimed is:

1. A method for forming carbon allotropes, comprising:
treating a carbonaceous compound to form a feedstock comprising at least about 10 mol % oxygen, at least about 10 mol % carbon, and at least about 20 mol % hydrogen;
heating, via a heat exchanger, the feedstock with waste heat from a waste gas stream;
forming carbon allotropes from the feedstock in a reactor in a Bosch reaction at a temperature of at least about 500° C.;
separating, via a separator vessel disposed downstream of the reactor, the carbon allotropes from a reactor effluent stream, forming the waste gas stream having waste heat from the reactor;
passing the waste gas stream through the heat exchanger to an ambient-temperature heat exchanger to condense water in the waste gas stream to give a dry waste gas stream; and
passing the dry waste gas stream to a fractionation system comprising a separation column.

2. The method of claim 1, comprising condensing and removing, via a second ambient-temperature heat exchanger, residual water in the dry waste gas stream before introducing the dry waste gas stream into the fractionation system, wherein treating the carbonaceous compound comprises flashing a liquid into a gas to form the feedstock.

3. The method of claim 1, wherein treating the carbonaceous compound comprises cracking the carbonaceous compound.

4. The method of claim 1, wherein treating the carbonaceous compound comprises steam reforming the carbonaceous compound.

5. The method of claim 1, comprising introducing the feedstock to a bottom portion of the reactor to fluidize a catalyst in the reactor, wherein the reactor comprises a fluidized bed reactor, and wherein treating the carbonaceous compound comprises shredding a material comprising the carbonaceous compound.

6. The method of claim 1, wherein treating the carbonaceous compound comprises treating the carbonaceous compound in a gassifier, wherein the reactor comprises a fluidized bed reactor, and wherein the heat exchanger comprises a shell-and-tube heat exchanger.

7. The method of claim 1, wherein treating the carbonaceous compound to form the feedstock comprises removing compounds from the feedstock, the compounds comprising elements other than carbon, hydrogen, and oxygen.

8. A system for the production of carbon allotropes, comprising:
- a feed gas heater to receive a feedstock comprising at least about 10 mol % oxygen, at least about 10 mol % carbon, and at least about 20 mol % hydrogen, the feed gas heater comprising a heat exchanger to heat the feedstock with waste heat from a waste gas stream;
- a reactor to form carbon allotropes from the feedstock in a Bosch reaction, the reactor comprising an inlet to receive the feedstock and an outlet to discharge a reactor effluent stream;
- a separator to separate the carbon allotropes from the reactor effluent stream, forming the waste gas stream, the separator comprising an inlet to receive the reactor effluent stream, a first outlet to discharge the carbon allotropes, and a second outlet to discharge the waste gas stream; and
- a water removal system comprising:
  - an ambient temperature heat exchanger to condense a bulk of water in the waste gas stream; and
  - a separation vessel to separate the bulk of the water from the waste gas stream to form a dry waste gas stream.

9. The system of claim 8, wherein the feedstock comprises an organic liquid, and wherein the heat exchanger comprises a ceramic block heat exchanger.

10. The system of claim 8, wherein the feedstock comprises syngas.

11. The system of claim 8, comprising:
- a gassifier comprising a pyrolysis reactor to treat a carbonaceous compound to form the feedstock;
- an amine contactor to remove sulfur compounds comprising hydrogen sulfide from the feedstock discharged from the gassifier and prior to introduction of the feedstock into the reactor; and
- a control valve to regulate flow of the feedstock to the reactor.

12. The system of claim 8, wherein the heat exchanger comprises a shell-and-tube heat exchanger, and wherein the ambient temperature heat exchanger comprises a water chiller or an air cooled heat exchanger.

13. The system of claim 8, wherein the feedstock comprises at least about 20 mol % oxygen, at least about 20 mol % carbon, and at least about 40 mol % hydrogen, and wherein the separation vessel comprising an inlet to receive the waste gas stream, a first outlet to discharge the bulk of the water from the waste gas stream, and a second outlet to discharge the dry waste gas stream.

14. The system of claim 8, wherein the feedstock comprises carbon dioxide and methane, wherein the separation vessel comprises a water-settling vessel having a bottom discharge for the bulk of the water separated from the waste gas stream, and further comprising a second ambient-temperature heat exchanger to condense residual water in the dry waste gas stream.

15. The system of claim 8, wherein the feedstock comprises carbon monoxide and hydrogen, wherein the separator comprises a cyclonic separator, and wherein the heat exchanger comprises:
- a first inlet to receive the waste gas stream;
- a first outlet to discharge the waste gas stream;
- a second inlet to receive the feedstock; and
- a second outlet to discharge the feedstock heated by the waste gas stream via the heat exchanger.

16. The system of claim 8, comprising an amine adsorbent system comprising an amine contactor to remove sulfur compounds comprising hydrogen sulfide from the feedstock.

17. The system of claim 16, wherein the reactor comprises a reaction vessel comprising the inlet to receive the feedstock and the outlet for the reactor effluent.

18. The system of claim 16, comprising a treatment system to receive and treat a carbonaceous material to form the feedstock, wherein the treatment system comprises a pyrolysis reactor comprising heaters, wherein the pyrolysis reactor comprises:
- a feed inlet to receive the carbonaceous material as feed material; and
- a gas inlet to receive an inert gas to sweep the degradation product out of the pyrolysis reactor through an outlet of the pyrolysis reactor, and wherein the carbonaceous compound comprises used tires, recycled plastics, or recycled paper products.

19. The system of claim 8, comprising a compressor configured to increase the pressure of the dry waste gas stream to facilitate removal of water from the dry waste gas stream.

20. The system of claim 8, comprising:
- a catalyst separator disposed upstream of the separator to separate catalyst from the reactor effluent and return the catalyst to the reactor; and
- a fractionation system comprising a separation column to process the waste gas stream.

21. The system of claim 20, comprising a static mixer to mix a methane rich stream, or a $CO_2$ rich stream, or both, from the fractionation system with the feedstock.

22. The system of claim 8, wherein the reactor is a fluidized bed reactor, and wherein the inlet comprises a bottom inlet to receive a bottom fed flow of feedstock to fluidize a catalyst.

23. The system of claim 8, comprising a gas fractionation system to separate a methane rich stream and a $CO_2$ rich stream from the waste gas stream, the gas fractionation system comprising a separation column to discharge the methane rich stream as an overhead stream and discharge the $CO_2$ rich stream as a bottoms stream, wherein the reactor is a fluidized bed reactor.

24. The system of claim 23, comprising a static mixer to mix the methane rich stream into the feedstock before the feed gas heater.

25. A reaction system for forming carbon nanotubes, comprising:
- a reactor comprising a fluidized-bed reactor configured to form carbon nanotubes from a feedstock in a Bosch reaction, wherein the feedstock comprises at least about 10 mol % oxygen, at least about 10 mol % carbon, and at least about 20 mol % hydrogen;
- a cyclonic separator downstream of the reactor, wherein the cyclonic separator is configured to remove carbon nanotubes from an effluent from the reactor, forming a waste gas stream;
- a feed heater downstream of the cyclonic separator, wherein the feed heater comprises a heat exchanger configured to heat a feed gas stream comprising the feedstock for the reactor with waste heat from the waste gas stream from the effluent from the reactor;

a first ambient temperature heat exchanger downstream of the feed heater, wherein the first ambient temperature heat exchanger is configured to condense and remove water from the waste gas stream, forming a dry waste gas stream;

a compressor configured to increase the pressure of the dry waste gas stream;

a second ambient temperature heat exchanger downstream of the compressor, configured to condense and remove water from the dry waste gas stream;

a gas fractionation system configured to separate the dry waste gas stream into a methane enriched stream and a carbon dioxide enriched stream, the gas fractionation system comprising a separation column; and a mixer configured to blend the methane enriched stream or the carbon dioxide enriched stream into the feedstock to form the feed gas stream.

26. The reaction system of claim 25, comprising:

a first separator vessel disposed downstream of and to cooperate with the first ambient temperature heat exchanger to remove the water from the effluent, forming the waste stream; and a second separator vessel disposed and downstream of and to cooperate with the second ambient temperature heat exchanger to remove water from the waste stream, wherein the mixer comprises a static mixer.

27. The reaction system of claim 25, comprising an amine adsorbent system comprising an amine contactor to remove hydrogen sulfide from the feedstock.

28. The reaction system of claim 27, wherein the amine contactor comprises a series of plates to promote mixing of the feedstock with an amine in the amine contactor by forcing a cross current contact of the feedstock with the amine.

29. The reaction system of claim 25, wherein the feedstock comprises a liquid feedstock for vaporization and injection into the reactor.

* * * * *